US012305999B2

(12) United States Patent
Teramoto et al.

(10) Patent No.: US 12,305,999 B2
(45) Date of Patent: May 20, 2025

(54) TIRE MANAGEMENT SYSTEM, TIRE MANAGEMENT METHOD

(71) Applicant: Sumitomo Rubber Industries, Ltd., Kobe (JP)

(72) Inventors: Masaki Teramoto, Kobe (JP); Kazuharu Tanimura, Kobe (JP); Yukinori Hashimoto, Kobe (JP); Takahiro Nishimoto, Kobe (JP); Kenji Yoneda, Kobe (JP)

(73) Assignee: SUMITOMO RUBBER INDUSTRIES, LTD., Kobe (JP)

( * ) Notice: Subject to any disclaimer, the term of this patent is extended or adjusted under 35 U.S.C. 154(b) by 213 days.

(21) Appl. No.: 18/023,005

(22) PCT Filed: Oct. 26, 2021

(86) PCT No.: PCT/JP2021/039440
§ 371 (c)(1),
(2) Date: Feb. 24, 2023

(87) PCT Pub. No.: WO2022/137783
PCT Pub. Date: Jun. 30, 2022

(65) Prior Publication Data
US 2023/0304808 A1 Sep. 28, 2023

(30) Foreign Application Priority Data
Dec. 23, 2020 (JP) .................. 2020-213936

(51) Int. Cl.
*G01C 21/00* (2006.01)
*G01C 21/34* (2006.01)
*G01C 21/36* (2006.01)
(52) U.S. Cl.
CPC ..... *G01C 21/3461* (2013.01); *G01C 21/3697* (2013.01)

(58) Field of Classification Search
CPC .................. G01C 21/3461; G01C 21/3697
(Continued)

(56) References Cited

U.S. PATENT DOCUMENTS

2002/0044051 A1* 4/2002 Sugisawa .............. B60C 23/061
340/444
2020/0001789 A1* 1/2020 Leem ........................ B60R 1/27
(Continued)

FOREIGN PATENT DOCUMENTS

EP 1184208 A1 3/2002
JP 2002-81945 A 3/2002
(Continued)

OTHER PUBLICATIONS

Office Action issued on Apr. 20, 2021, in corresponding Japanese patent Application No. 2020-213936, 3 pages.
(Continued)

*Primary Examiner* — Mahmoud S Ismail
(74) *Attorney, Agent, or Firm* — XSENSUS LLP

(57) ABSTRACT

A tire management system (100) includes: an acquisition processing portion (62) that acquires state information regarding a state of a pneumatic tire (11) attached to a vehicle (1); a detection processing portion (63) that detects an abnormality of the pneumatic tire (11) based on the state information acquired by the acquisition processing portion (62); and a first output processing portion (64) that, when the detection processing portion (63) has detected the abnormality, outputs first route information to a display portion of a vehicle-mounted communication apparatus (13) of the vehicle (1), wherein the first route information includes a first route that is a route to, among a plurality of predetermined stop spots, a specific stop spot that has a stop space corresponding to a size of the vehicle (1).

14 Claims, 6 Drawing Sheets

(58) Field of Classification Search
USPC .......................................................... 701/425
See application file for complete search history.

(56) References Cited

U.S. PATENT DOCUMENTS

| | | | |
|---|---|---|---|
| 2020/0159251 A1 | 5/2020 | Iwasaki et al. | |
| 2020/0160476 A1* | 5/2020 | Ramot | G06F 16/29 |
| 2020/0215859 A1 | 7/2020 | Horikoshi | |
| 2024/0037997 A1* | 2/2024 | Natarajan | G08G 1/202 |

FOREIGN PATENT DOCUMENTS

| | | |
|---|---|---|
| JP | 2002-109690 A | 4/2002 |
| JP | 2002-211217 A | 7/2002 |
| JP | 2004-318536 A | 11/2004 |
| JP | 2005-45501 A | 2/2005 |
| JP | 2008-195147 A | 8/2008 |
| JP | 2017-199177 A | 11/2017 |
| JP | 2019-6266 A | 1/2019 |
| JP | 2020-98610 A | 6/2020 |

OTHER PUBLICATIONS

Office Action issued on Sep. 7, 2021, in corresponding Japanese patent Application No. 2020-213936, 5 pages.
Extended European search report issued on Jul. 12, 2024, in corresponding European patent Application No. 21909940.5, 8 pages.
International Search Report and Written Opinion mailed on Feb. 1, 2022, received for PCT Application PCT/JP2021/039440, filed on Oct. 26, 2021, 12 pages including English Translation.

* cited by examiner

TIRE MANAGEMENT SYSTEM, TIRE MANAGEMENT METHOD

CROSS-REFERENCE TO RELATED APPLICATIONS

The present application is a 371 of PCT/JP2021/039440, filed Oct. 26, 2021, which claims priority from JP 2020-213936, filed Dec. 23, 2020, where the entire contents of each are incorporated herein by reference.

TECHNICAL FIELD

The present disclosure relates to a tire management system and a tire management method.

BACKGROUND ART

There is known a system that, when it is determined that a pneumatic tire (hereinafter, merely referred to as "tire") attached to a vehicle such as an automobile is punctured, issues an alert indicating that the tire is punctured (see PTL 1).

CITATION LIST

Patent Literature

[PTL 1] Japanese Patent Application Publication No. 2019-6266

SUMMARY OF THE INVENTION

Problems to be Solved by the Invention

Meanwhile, when it is determined that the tire is punctured, it would be able to secure the safety of the vehicle if it were possible to guide the vehicle to a closest stop spot such as a gasoline stand or a convenience store.

However, with a configuration where the stop spot as the guide destination is determined regardless of the size of the vehicle, a stop spot that does not have a stop space for the vehicle to stop may be determined as the guide destination when the vehicle is a large vehicle such as a semi-trailer.

It is therefore an object of the present disclosure to provide a tire management system and a tire management method that can guide a vehicle to a stop spot corresponding to the size of the vehicle when an abnormality has occurred to a tire.

Solution to the Problems

A tire management system according to an aspect of the present disclosure includes an acquisition processing portion, a detection processing portion, and a first output processing portion. The acquisition processing portion acquires state information regarding a state of a pneumatic tire attached to a vehicle. The detection processing portion detects an abnormality of the pneumatic tire based on the state information acquired by the acquisition processing portion. The first output processing portion, when the detection processing portion has detected the abnormality, outputs first route information to an output destination corresponding to the vehicle, wherein the first route information includes a first route that is a route to, among a plurality of predetermined stop spots, a specific stop spot that has a stop space corresponding to a size of the vehicle.

With the above-described configuration, it is possible to, when the abnormality has been detected, transmit, to the driver of the vehicle or the like, a route to the specific stop spot that has a stop space corresponding to the size of the vehicle. It is thus possible to guide the vehicle to a stop spot corresponding to the size of the vehicle.

Advantageous Effects of the Invention

According to the present disclosure, it is possible to guide a vehicle to a stop spot corresponding to the size of the vehicle when an abnormality has occurred to a tire.

DESCRIPTION OF EMBODIMENTS

The following describes embodiments of the present disclosure with reference to the accompanying drawings. It should be noted that the following embodiments are examples of specific embodiments of the present disclosure and should not limit the technical scope of the present disclosure.

First Embodiment

Figure 1:
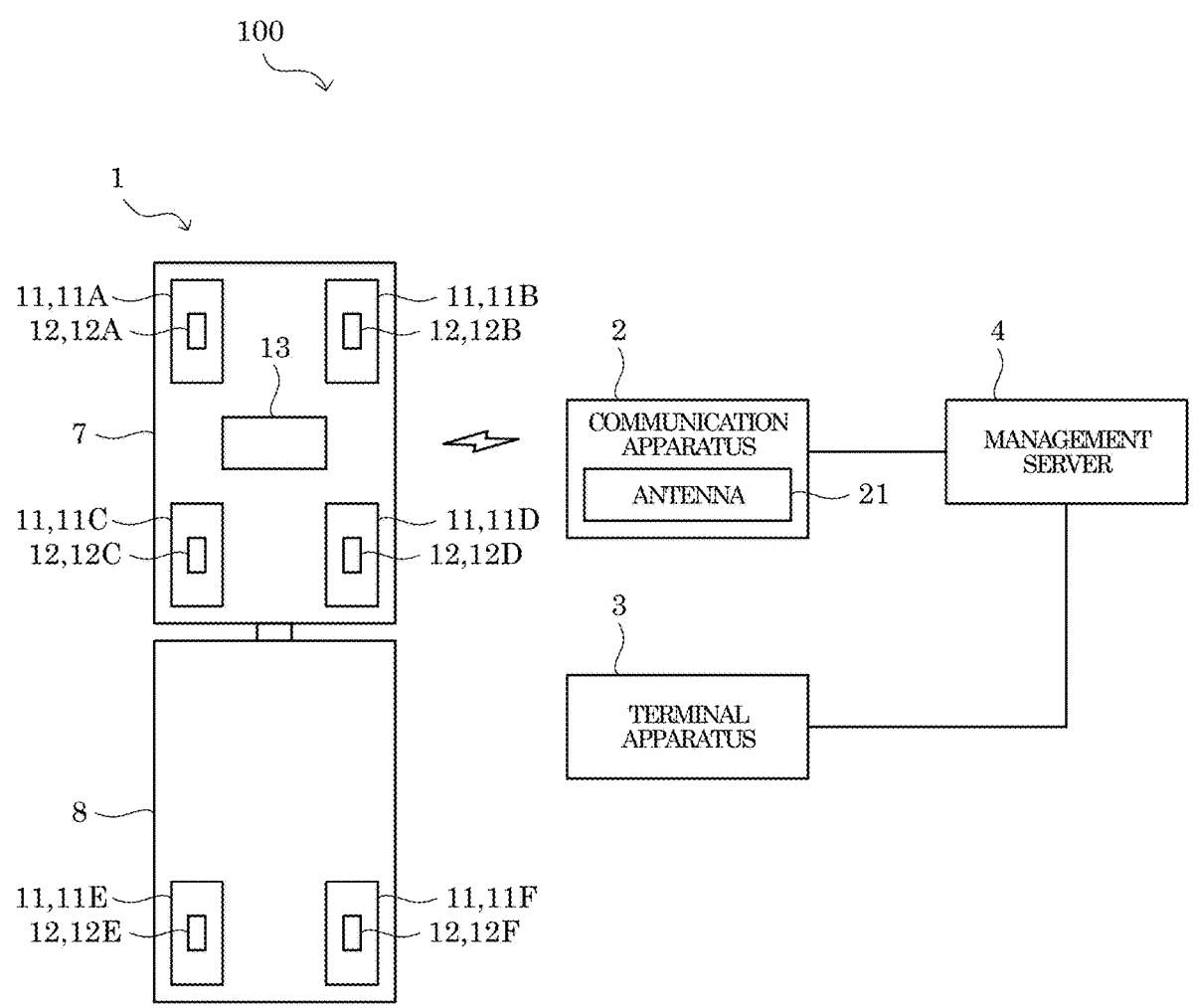
FIG. 1 is a diagram showing a configuration of a tire management system according to a first embodiment of the present disclosure.

First, with reference to FIG. 1, a description is given of a configuration of a tire management system 100 according to a first embodiment of the present disclosure.

As shown in FIG. 1, the tire management system 100 includes a vehicle 1, a communication apparatus 2, a terminal apparatus 3, and a management server 4.

In the tire management system 100, the management server 4 is connected so as to mutually communicate with the communication apparatus 2 and the terminal apparatus 3 via a communication network such as the Internet or a LAN (Local Area Network).

The vehicle 1 is an automobile to which pneumatic tires (hereinafter, merely referred to as "tires") 11 that are a management object in the tire management system 100, are attached. For example, the vehicle 1 is a connected vehicle composed of a tractor 7 (see FIG. 1) and a trailer 8 (see FIG. 1) drawn by the tractor 7. The connected vehicle is also commonly called a semi-trailer or the like. It is noted that the vehicle 1 may be a tractor or a trailer. In addition, the vehicle 1 may be a truck crane, a truck, a bus, or a passenger car.

The vehicle 1 includes a plurality of tires 11 (see FIG. 1). FIG. 1 shows six tires 11 included in the vehicle 1. Of the six tires 11, a tire 11A is attached to a front-left wheel of the tractor 7. In addition, a tire 11B is attached to a front-right wheel of the tractor 7. In addition, a tire 11C is attached to a rear-left wheel of the tractor 7. In addition, a tire 11D is attached to a rear-right wheel of the tractor 7. In addition, a tire 11E is attached to a rear-left wheel of the trailer 8. In addition, a tire 11F is attached to a rear-right wheel of the trailer 8. It is noted that the number of the tires 11 of the vehicle 1 may not be limited to six.

As shown in FIG. 1, the vehicle 1 includes a plurality of detection devices 12. Of the plurality of detection devices 12, a detection device 12A is provided in the tire 11A. In addition, a detection device 12B is provided in the tire 11B. In addition, a detection device 12C is provided in the tire 11C. In addition, a detection device 12D is provided in the tire 11D. In addition, a detection device 12E is provided in the tire 11E. In addition, a detection device 12F is provided in the tire 11F.

Each of the detection devices 12 includes an air pressure detection portion that detects an air pressure and an air temperature in the tire 11 in which that detection device 12 is provided. The air pressure detection portion includes a pressure sensor and a temperature sensor.

In addition, each of the detection devices 12 includes a communication portion that is used to perform a wireless communication with a vehicle-mounted communication apparatus 13 (see FIG. 1). The communication portion includes a transmitter and an antenna.

Specifically, the detection device 12 executes a wireless communication according to a predetermined first wireless communication standard, with the vehicle-mounted communication apparatus 13 that is present in a communication range of the first wireless communication standard from the detection device 12. For example, the first wireless communication standard is IEEE that is well known as an international standard, or a wireless communication standard conforming to IEEE. For example, the first wireless communication standard is Bluetooth (registered trademark) or Wi-Fi (registered trademark). In this case, the detection device 12 can execute wireless communication with the vehicle-mounted communication apparatus 13 that is present in a range of over ten meters. It is noted that the first wireless communication standard may be a standard that is different from Bluetooth and Wi-Fi.

The detection device 12 transmits state data to the vehicle-mounted communication apparatus 13 that is wirelessly connected therewith. The state data includes detection device identification information, air pressure information, and air temperature information, wherein the detection device identification information is used to identify the detection device 12, the air pressure information indicates the air pressure inside the tire 11 detected by the air pressure detection portion, and the air temperature information indicates the air temperature inside the tire 11 detected by the air pressure detection portion. The air pressure information and the air temperature information are each a type of state information regarding the state of the tires 11 attached to the vehicle 1.

For example, the detection device 12 executes a detection process and a transmission process at a predetermined execution cycle. In the detection process, the air pressure and the air temperature of the tire 11 are detected by using the air pressure detection portion. In the transmission process, the state data that includes the detection results of the detection process is transmitted to the vehicle-mounted communication apparatus 13. For example, the execution cycle is an arbitrarily determined time between 10 (ten) seconds and 10 (ten) minutes.

It is noted that the detection device 12 may include, in place of the air pressure detection portion or together with the air pressure detection device, an acceleration sensor that detects accelerations in a rotation direction, a rotation axis direction, and a radial direction of the tire 11. In this case, the state information may include acceleration information that indicates the accelerations in the three directions of the tire 11 detected by the acceleration sensor. The acceleration information is a type of state information regarding the state of the tires 11 attached to the vehicle 1.

In addition, the detection device 12 may execute the detection process and the transmission process upon receiving a predetermined control signal transmitted from the management server 4 via the communication apparatus 2 and the vehicle-mounted communication apparatus 13.

The vehicle 1 includes the vehicle-mounted communication apparatus 13 (see FIG. 1). The vehicle-mounted communication apparatus 13 is installed at a position where it can execute a wireless communication according to the first wireless communication standard with each of the detection devices 12.

The vehicle-mounted communication apparatus 13 receives the state data transmitted from the detection devices 12.

In addition, the vehicle-mounted communication apparatus 13 acquires position information that indicates the current position of the vehicle 1. For example, the vehicle-mounted communication apparatus 13 is provided with a GPS receiver that receives radio waves transmitted from a GPS satellite. The vehicle-mounted communication apparatus 13 acquires the position information based on information that is included in the radio waves received by the GPS receiver.

In addition, the vehicle-mounted communication apparatus 13 executes a wireless communication according to a predetermined second wireless communication standard, with the communication apparatus 2 (see FIG. 1) that is present in a communication range of the second wireless communication standard from the vehicle-mounted communication apparatus 13. For example, the second wireless communication standard is LTE (registered trademark). In this case, the vehicle-mounted communication apparatus 13 can execute wireless communication with the communication apparatus 2 that is present in a range of several kilometers. It is noted that the second wireless communication standard may be different from LTE.

The vehicle-mounted communication apparatus 13 transmits the state data received from the detection devices 12, to the communication apparatus 2 that is wirelessly connected therewith. Specifically, upon receiving the state data from a detection device 12, the vehicle-mounted communication apparatus 13 adds additional data to the received state data. Subsequently, the vehicle-mounted communication apparatus 13 transmits the state data added with the additional data to the communication apparatus 2. The additional data includes: communication apparatus identification information that is used for identifying the vehicle-mounted communication apparatus 13; the position information; and reception date/time information indicating the date and the time at which the state data was received.

In addition, the vehicle-mounted communication apparatus 13 includes a display portion that is used to display information output from the management server 4.

The communication apparatus 2 receives the state data transmitted from the vehicle-mounted communication apparatus 13. The communication apparatus 2 may be installed at an arbitrary position.

As shown in FIG. 1, the communication apparatus 2 includes an antenna 21. The antenna 21 is used for wireless communication with the vehicle-mounted communication apparatus 13. The communication apparatus 2 executes a wireless communication according to the second wireless communication standard with the vehicle-mounted communication apparatus 13 that is present in a communication range of the second wireless communication standard from the antenna 21.

In addition, upon receiving the state data from the vehicle-mounted communication apparatus 13, the communication apparatus 2 transmits the received state data to the management server 4.

The terminal apparatus 3 is an information processing apparatus that is used by employees of a provider who provides a road service. Here, the road service is performed such that when a trouble occurs in a vehicle, a dispatched person rushes to the current position of the vehicle to cope with the trouble of the vehicle. For example, the terminal apparatus 3 is a personal computer installed at a call center of the provider. It is noted that the terminal apparatus 3 may be a smartphone, a tablet terminal or the like used by the employees of the provider.

The management server 4 executes, based on the state data, various processes regarding the management of the tires 11.

[Configuration of Management Server 4]

Next, a configuration of the management server 4 is described with reference to FIG. 2.

Figure 2:
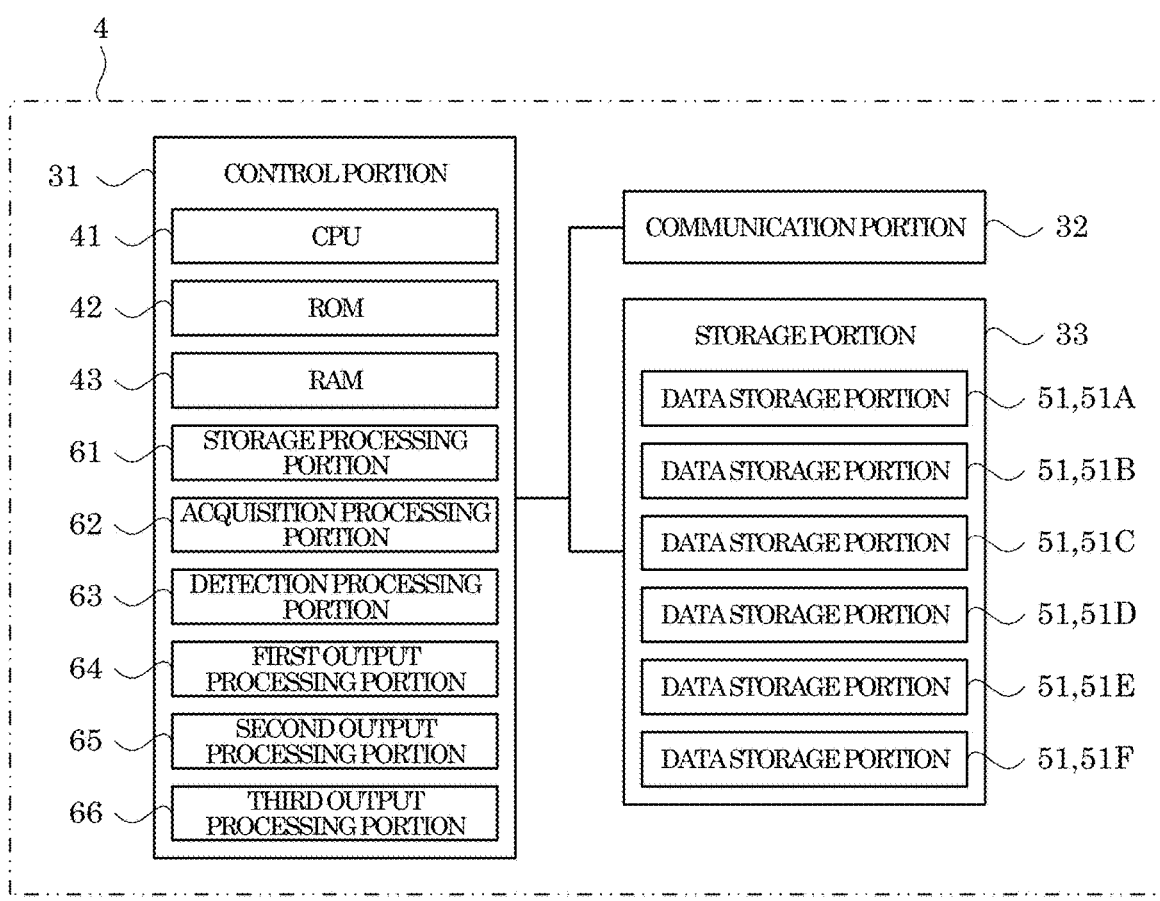
FIG. 2 is a diagram showing a configuration of a management server of the tire management system according to the first embodiment of the present disclosure.

As shown in FIG. 2, the management server 4 includes a control portion 31, a communication portion 32, and a storage portion 33.

The control portion 31 comprehensively controls the management server 4. As shown in FIG. 2, the control portion 31 includes a CPU 41, a ROM 42, and a RAM 43. The CPU 41 is a processor that executes various types of calculation processes. The ROM 42 is a nonvolatile storage device in which are preliminarily stored various types of information such as control programs for causing the CPU 41 to execute various processes. The RAM 43 is a volatile or nonvolatile storage device that is used as a temporary storage memory (working area) for the various types of processes executed by the CPU 41. In the control portion 31, the CPU 41 executes the various types of control programs that are preliminarily stored in the ROM 42. This allows the control portion 31 to comprehensively control the management server 4.

The communication portion 32 is a communication interface configured to perform a wired or wireless data communication with external communication apparatuses such as the communication apparatus 2, via the communication network.

The storage portion 33 is a nonvolatile storage device. For example, the storage portion 33 is a storage device such as: a nonvolatile memory such as a flash memory or an EEPROM (registered trademark); an SSD (Solid State Drive); or an HDD (Hard Disk Drive).

In the storage portion 33, vehicle information for each vehicle 1 registered in the management server 4 is preliminarily stored. The vehicle information is information regarding the vehicle 1. The vehicle information includes information such as a type, a size, a weight, a color, and an automobile registration number of the vehicle 1. In addition, the vehicle information includes: vehicle identification information used for identifying the vehicle 1; the communication apparatus identification information for identifying the vehicle-mounted communication apparatus 13 included in the vehicle 1; the detection device identification information of the detection devices 12 respectively corresponding to the tires 11 attached to the vehicle 1. In addition, the vehicle information includes tire information corresponding to the tires 11 attached to the vehicle 1. The tire information is information regarding the tires 11. The tire information includes a type, a size, and a manufacture timing of each of the tires 11.

In addition, the storage portion 33 stores map information that includes a map of a predetermined specific region. The specific region is a region or a country in which the vehicle 1 is used. The map includes roads where automobiles can pass through.

In addition, the storage portion 33 stores road identification information that is used for identifying a specific road that is, among the roads included in the map, corresponding to a predetermined specific vehicle. The specific vehicle is a vehicle either or both of whose size and weight exceed a predetermined reference value, and the roads that the specific vehicle can pass through are limited. The specific road is a road that is preliminarily designated as a road that the specific vehicle can pass through. For example, the specific road is a highway.

In addition, the storage portion 33 stores stop spot information corresponding to each of stop spots preliminarily registered in the management server 4. The stop spots are places that are present in the specific region and each include a stop space where automobiles can stop. For example, the stop spot is a gasoline stand, a service station, a parking area of a highway, a service area of a highway, a convenience store, a parking lot of a commercial facility such as a shopping mall, a rental parking lot such as a coin-parking lot, an automobile dealer, and an automobile garage. The stop spot information is information regarding the stop spots. The stop spot information includes information such as the name, the location, and the telephone number of each stop spot, the size of the stop space, and the number of the stop spaces.

In addition, as shown in FIG. 2, the storage portion 33 includes six data storage portions 51. The six data storage portions 51 are provided for each vehicle 1 preliminarily registered in the management server 4.

Of the six data storage portions 51, a data storage portion 51A is a storage area of the storage portion 33 that is used to store the state data corresponding to the tire 11A. In addition, a data storage portion 51B is a storage area of the storage portion 33 that is used to store the state data corresponding to the tire 11B. In addition, a data storage portion 51C is a storage area of the storage portion 33 that is used to store the state data corresponding to the tire 11C. In addition, a data storage portion 51D is a storage area of the storage portion 33 that is used to store the state data corresponding to the tire 11D. In addition, a data storage portion 51E is a storage area of the storage portion 33 that is used to store the state data corresponding to the tire 11E. In addition, a data storage portion 51F is a storage area of the storage portion 33 that is used to store the state data corresponding to the tire 11F.

Here, according to the tire management system 100 of the first embodiment of the present disclosure, when an abnormality has occurred to the tire 11, it is possible to guide the vehicle 1 to a stop spot corresponding to the size of the vehicle 1.

Specifically, as shown in FIG. 2, the control portion 31 includes a storage processing portion 61, an acquisition processing portion 62, a detection processing portion 63, a first output processing portion 64, a second output processing portion 65, and a third output processing portion 66. For example, the control portion 31 functions as the storage processing portion 61, the acquisition processing portion 62, the detection processing portion 63, the first output processing portion 64, the second output processing portion 65, and the third output processing portion 66 by executing a tire management program preliminarily stored in the storage portion 33. It is noted that a part or all of processing portions included in the control portion 31 may be composed of an electronic circuit. In addition, the tire management program may be a program for causing a plurality of processors to function as the various types of processing portions.

Upon receiving the state data transmitted from the communication apparatus 2, the storage processing portion 61 stores the received state data to one of the data storage portions 51.

Specifically, the storage processing portion 61 determines one of the data storage portions 51 as the storage destination of the state data based on the communication apparatus identification information and the detection device identification information included in the received state data. Subsequently, the storage processing portion 61 stores the received state data in the data storage portion 51 determined as the storage destination.

Upon arrival of a predetermined acquisition timing, the acquisition processing portion 62 acquires the state information regarding the state of the tires 11 attached to the vehicle 1.

For example, the acquisition timing is a timing when a new piece of state data has been stored in the data storage portion 51. In this case, the acquisition processing portion 62 acquires the state information regarding the vehicle 1 for which the piece of state data has been stored in the data storage portion 51.

For example, upon arrival of the acquisition timing, the acquisition processing portion 62 acquires a plurality of pieces of state data selected in order from a piece of state data added with the latest piece of reception date/time information, from each of the data storage portions 51 corresponding to the vehicle 1.

It is noted that the acquisition timing may arrive at a predetermined cycle. In addition, the acquisition timing may be when an instruction to acquire the state information is input to the management server 4 via an information processing apparatus such as a personal computer communicably connected with the management server 4.

In addition, the acquisition processing portion 62 may acquire the state information for a part of the plurality of tires 11 attached to the vehicle 1. In addition, the acquisition processing portion 62 may transmit the control signal to the detection devices 12 of the vehicle 1 via the communication apparatus 2 and the vehicle-mounted communication apparatus 13 and acquire the state data transmitted from the detection devices 12 in response to the input of the control signal.

The detection processing portion 63 detects the abnormality of the tire 11 based on the state information acquired by the acquisition processing portion 62.

For example, the abnormality includes a first abnormality where the air pressure of the tire 11 is out of a predetermined reference range. In addition, the abnormality includes a second abnormality where a decrease speed of the air pressure of the tire 11 exceeds a predetermined reference speed.

Specifically, the detection processing portion 63 determines, for each of the tires 11, whether or not the first abnormality is present based on the latest piece of state data acquired by the acquisition processing portion 62. For example, the detection processing portion 63 determines that the first abnormality is present when the air pressure information corrected based on the air temperature information is out of the reference range.

In addition, the detection processing portion 63 determines, for each of the tires 11, whether or not the second abnormality is present based on the plurality of pieces of state data acquired by the acquisition processing portion 62. For example, the detection processing portion 63 determines that the second abnormality is present when the decrease speed of the air pressure of the tire 11 calculated based on the plurality of pieces of state data exceeds the reference speed.

It is noted that when the acceleration information is included in the state data, the detection processing portion 63 may detect the abnormality based on the acceleration information. In this case, the abnormality includes a third abnormality where the tire 11 vibrates in the axis direction or the radial direction. In addition, the detection processing portion 63 determines whether or not the third abnormality is present based on the acceleration information.

In addition, the detection processing portion 63 may detect the abnormality for a part of the plurality of tires 11 attached to the vehicle 1.

When the detection processing portion 63 has detected the abnormality, the first output processing portion 64 outputs first route information to an output destination corresponding to the vehicle 1, wherein the first route information includes a first route that is a route to, among a plurality of stop spots, a specific stop spot that has a stop space corresponding to the size of the vehicle 1.

For example, the first output processing portion 64 outputs the first route information including the first route that is a route to a specific stop spot that is present in a range of a predetermined first specific distance from the current position of the vehicle 1.

For example, the first specific distance is an arbitrarily determined distance between 1 (one) kilometer and 50 kilometers. It is noted that the first specific distance may be determined based on one or more of: a type of the detected abnormality; a degree of the abnormality; and a weight of the vehicle 1.

Specifically, the first output processing portion 64 selects, based on the vehicle information and the stop spot information, the specific stop spot from a plurality of stop spots preliminarily registered in the management server 4. For example, the first output processing portion 64 selects the specific stop spot based on: size information of the vehicle 1 included in the vehicle information; and size information of the stop space included in the stop spot information. In addition, the first output processing portion 64 may select the specific stop spot based on: information related to the size of the vehicle 1 included in the vehicle information; and the size information of the stop space included in the stop spot information. For example, the first output processing portion 64 may select the specific stop spot based on: type information of the vehicle 1 included in the vehicle information; and the size information of the stop space included in the stop spot information. In this case, the first output processing portion 64 may determine the size of the vehicle 1 based on: the type information of the vehicle 1 included in the vehicle information; and the size information corresponding to the type of the vehicle 1 (standard-sized passenger car, small-sized passenger car, etc.) preliminarily stored in the storage portion 33. In addition, the information related to the size of the vehicle 1 included in the vehicle information may be weight information or a classification number included in the automobile registration number. That is, the specific stop spot may be selected based on approximate measurements preliminarily associated with the vehicle type, the weight or the like of the vehicle 1. In addition, the first output processing portion 64 selects the specific stop spot that is present in the range of the first specific distance from the current position of the vehicle 1, based on the position information added to the state data that was used to detect the abnormality.

The first output processing portion 64 determines any one of selected specific stop spots as the specific stop spot to be output.

Specifically, when one or more business offices that can provide a maintenance service corresponding to the abnormality that has occurred to the tire 11 are included in the selected specific stop spots, the first output processing portion 64 determines, as the specific stop spot to be output, a business office that is closest to the current position of the vehicle 1. For example, the business office is a gasoline stand, a service station, an automobile dealer, or an automobile garage. The maintenance service corresponding to the first abnormality is an air pressure adjustment service for adjusting the air pressure of the tire 11. The maintenance service corresponding to the second abnormality is a tire replacement service for replacing the tire 11 with another one. The maintenance service corresponding to the third abnormality is a vehicle inspection service to inspect the vehicle 1.

In addition, when no business office is included in the selected specific stop spots, the first output processing portion 64 determines, as the specific stop spot to be output, a specific stop spot that is closest to the current position of the vehicle 1. In addition, when no specific stop spot is present in the range of the first specific distance from the current position of the vehicle 1, the first output processing portion 64 outputs a message including an indication of the fact to the output destination corresponding to the vehicle 1.

It is noted that when one or more business offices are included in the selected specific stop spots, the first output processing portion 64 may determine, as the specific stop spot to be output, a business office that has a largest number of stop spaces where the vehicle 1 can stop. In addition, when no business office is included in the selected specific stop spots, the first output processing portion 64 may determine, as the specific stop spot to be output, a specific stop spot that has a largest number of stop spaces where the vehicle 1 can stop. In addition, the first output processing portion 64 may determine, as the specific stop spot to be output, a specific stop spot that is closest to the current position of the vehicle 1 or a specific stop spot that has a largest number of stop spaces where the vehicle 1 can stop, regardless of whether or not a business office is included in the selected specific stop spots. In addition, the first output processing portion 64 may determine, as the specific stop spot to be output, a specific stop spot that is closest to the current position of the vehicle 1 regardless of whether or not a specific stop spot is present in the range of the first specific distance from the current position of the vehicle 1.

Upon determining the specific stop spot to be output, the first output processing portion 64 acquires one or more first routes to the specific stop spot, based on the map information. Subsequently, the first output processing portion 64 determines any one of the acquired one or more first routes, as the first route to be output.

Here, when the vehicle 1 is not the specific vehicle, the first output processing portion 64 determines, as the first route to be output, a first route that has, among the acquired one or more first routes, the shortest passage distance to the specific stop spot to be output. The determination on whether or not the vehicle 1 is the specific vehicle is made based on the vehicle information.

In addition, when the vehicle 1 is the specific vehicle, the first output processing portion 64 determines, as the first route to be output, a specific first route that is one of the acquired one or more first routes and passes through the specific road. Specifically, the specific first route is a first route that passes through only the specific road(s). The specific road(s) is identified based on the road identification information. When the acquired one or more first routes do not include the specific first route, the first output processing portion 64 outputs a message including an indication of the fact to the output destination corresponding to the vehicle 1. It is noted that the specific first route may be a first route that passes through a specific road(s) and a road(s) that is different from the specific road(s) and has the shortest passage distance of the road(s) that is different from the specific road(s).

It is noted that the first output processing portion 64 may determine, as the first route to be output, a first route having, among the acquired one or more first routes, the shortest passage distance to the specific stop spot to be output, regardless of whether or not the vehicle 1 is the specific vehicle.

Upon determining the first route to be output, the first output processing portion 64 outputs the first route information including the first route to the output destination corresponding to the vehicle 1.

For example, the first route information is map information in which the first route to be output is identifiably displayed. It is noted that the first route information may include voice information for guiding the vehicle 1 to the specific stop spot to be output.

For example, the first output processing portion 64 outputs, to a display portion of the vehicle-mounted communication apparatus 13, a message that the abnormality has been detected, and the first route information. It is noted that the first output processing portion 64 may transmit an electronic mail including the message that the abnormality has been detected and the first route information, to an electronic mail address preliminarily associated with the vehicle 1.

The second output processing portion 65 is configured to, when the specific stop spot output by the first output processing portion 64 is not the business office, output first notification information that includes an indication that the abnormality has been detected, and the specific stop spot, to an output destination corresponding to the provider.

For example, the second output processing portion 65 outputs the first notification information when the vehicle for which the abnormality has been detected is not the tractor 7. In addition, the second output processing portion 65 does not output the first notification information when the vehicle for which the abnormality has been detected is the tractor 7.

The first notification information includes: an indication that the abnormality has been detected; a time at which the abnormality was detected; a request for dispatching the road service; a location of the specific stop spot; an expected arrival time of the vehicle 1 to the specific stop spot; and information such as the type, the size, the color, and the automobile registration number of the vehicle 1.

The second output processing portion 65 outputs the first notification information to the display portion of the terminal apparatus 3.

It is noted that the second output processing portion 65 may output the first notification information when the abnormality detected by the detection processing portion 63 is a predetermined specific abnormality. For example, the specific abnormality is the second abnormality. In addition, the second output processing portion 65 may unconditionally output the first notification information when the specific stop spot output by the first output processing portion 64 is not the business office.

The third output processing portion 66 outputs second route information to the output destination corresponding to the vehicle 1 when the specific stop spot output by the first output processing portion 64 is not the business office, the vehicle 1 is the connected vehicle, and the abnormality has been detected for the tire 11 attached to the tractor 7, wherein the second route information includes a second route that is a route to a business office that is present in a range of a predetermined second specific distance from the specific stop spot.

For example, the second specific distance is an arbitrarily determined distance between 1 (one) kilometer and 20 kilometers. It is noted that the second specific distance may be determined based on one or more of: a type of the detected abnormality; a degree of the abnormality: a weight of the tractor 7; and a distance travelled since the detection of the abnormality.

For example, when one or more business offices are present in the range of the second specific distance from the specific stop spot, the third output processing portion 66 outputs the second route information that includes the second route to a business office that is closest to the specific stop spot. In addition, when no business office is present in the range of the second specific distance from the specific stop spot, the third output processing portion 66 outputs a message including an indication of the fact to the output destination corresponding to the vehicle 1. In this case, the third output processing portion 66 may output the first notification information to the output destination corresponding to the provider.

For example, the second route information is, as is the case with the first route information, map information in which the second route to be output is identifiably displayed.

For example, when the vehicle 1 has arrived at the specific stop spot output by the first output processing portion 64, the third output processing portion 66 outputs, to the display portion of the vehicle-mounted communication apparatus 13, a message that urges to disconnect the trailer 8 from the tractor 7 at the specific stop spot, and the second route information.

It is noted that the control portion 31 may not include either or both of the second output processing portion 65 and the third output processing portion 66.

[First Tire Management Process]

Figure 3:
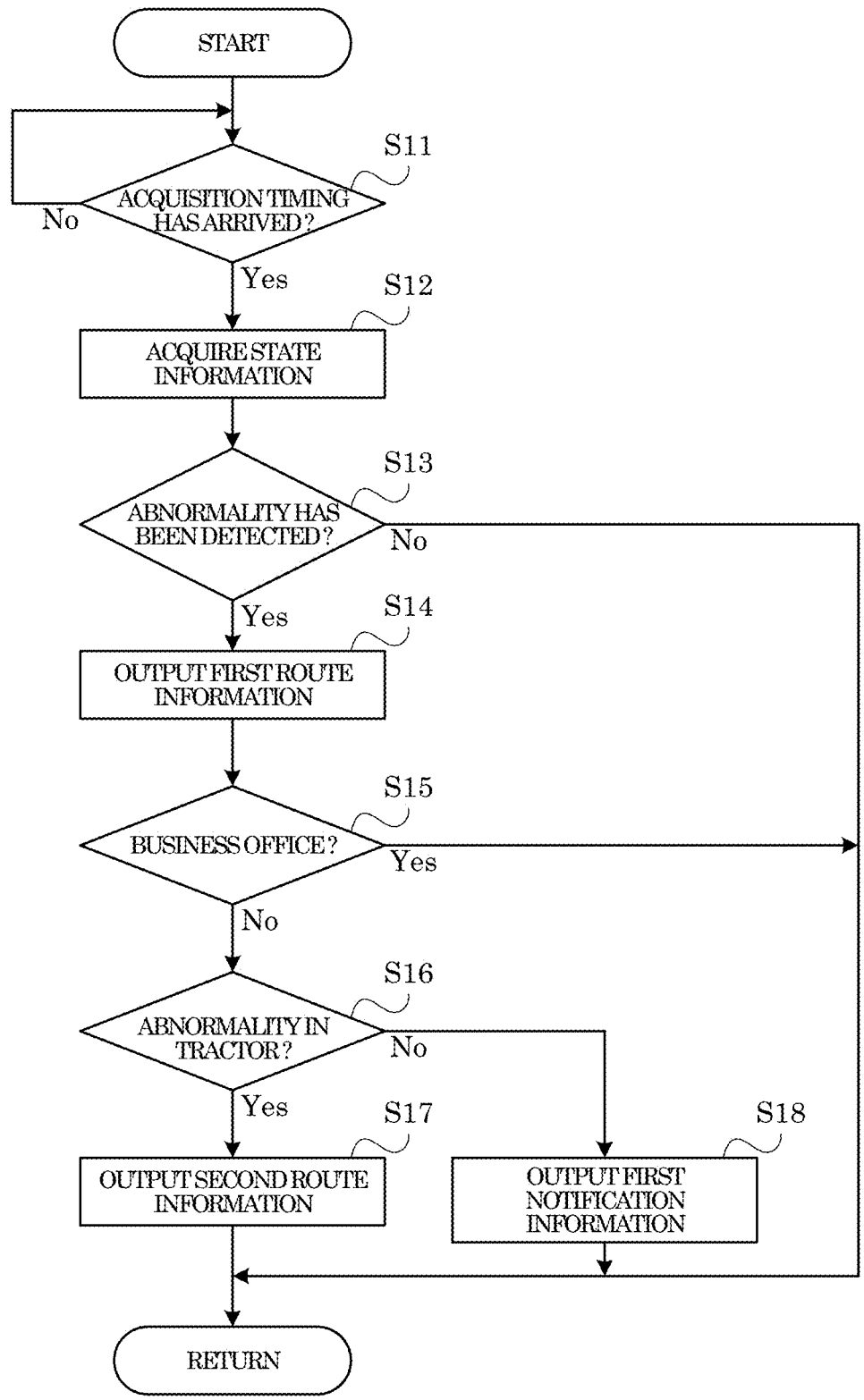
FIG. 3 is a flowchart showing an example of a first tire management process executed by the management server of the tire management system according to the first embodiment of the present disclosure.

In the following, with reference to FIG. 3, a description is given of an example of the procedure of a first tire management process executed by the control portion 31 of the management server 4 in the tire management system 100, as well as a tire management method of the present disclosure. Here, steps S11, S12, . . . represent numbers assigned to the processing procedures (steps) executed by the control portion 31.

<Step S11>

First, in step S11, the control portion 31 determines whether or not the acquisition timing has arrived. Here, the process of step S11 is executed by the acquisition processing portion 62 of the control portion 31.

Here, upon determining that the acquisition timing has arrived (Yes side at step S11), the control portion 31 moves the process to step S12. In addition, upon determining that the acquisition timing has not arrived (No side at step S11), the control portion 31 waits, at step S11, for the acquisition timing to arrive.

<Step S12>

In step S12, the control portion 31 acquires the state information. Here, the process of step S12 is an example of an acquisition step of the present disclosure and is executed by the acquisition processing portion 62 of the control portion 31.

<Step S13>

In step S13, the control portion 31 determines whether or not the abnormality has been detected, based on the state information acquired in step S12. Here, the process of step S13 is an example of a detection step of the present disclosure and is executed by the detection processing portion 63 of the control portion 31.

Here, upon determining that the abnormality has been detected (Yes side at step S13), the control portion 31 moves the process to step S14. In addition, upon determining that the abnormality has not been detected (No side at step S13), the control portion 31 moves the process to step S11.

<Step S14>

In step S14, the control portion 31 outputs the first route information to the output destination corresponding to the vehicle 1. Here, the process of step S14 is an example of an output step of the present disclosure and is executed by the first output processing portion 64 of the control portion 31.

<Step S15>

In step S15, the control portion 31 determines whether or not the specific stop spot included in the first route information output in step S14 is the business office.

Here, upon determining that the specific stop spot included in the first route information output in step S14 is the business office (Yes side at step S15), the control portion 31 moves the process to step S11. In addition, upon determining that the specific stop spot included in the first route information output in step S14 is not the business office (No side at step S15), the control portion 31 moves the process to step S16.

<Step S16>

In step S16, the control portion 31 determines whether or not the vehicle for which the abnormality has been detected is the tractor 7.

Here, upon determining that the vehicle for which the abnormality has been detected is the tractor 7 (Yes side at step S16), the control portion 31 moves the process to step S17. In addition, upon determining that the vehicle for which the abnormality has been detected is not the tractor 7 (No side at step S16), the control portion 31 moves the process to step S18.

<Step S17>

In step S17, the control portion 31 outputs the second route information to the output destination corresponding to the vehicle 1. Here, the process of step S17 is executed by the third output processing portion 66 of the control portion 31.

<Step S18>

In step S18, the control portion 31 outputs the first notification information to the output destination corresponding to the provider. Here, the process of step S18 is executed by the second output processing portion 65 of the control portion 31.

As described above, in the tire management system 100, the state information regarding the state of the tire 11 attached to the vehicle 1 is acquired, and the abnormality of the tire 11 is detected based on the acquired state information. In addition, when the abnormality has been detected, the first route information is output to the output destination corresponding to the vehicle 1, wherein the first route information includes the first route that is a route to, among a plurality of stop spots, the specific stop spot that has a stop space corresponding to the size of the vehicle 1. This makes it possible to, when the abnormality has been detected, transmit, to the driver of the vehicle 1 or the like, a route to the specific stop spot that has a stop space corresponding to the size of the vehicle 1. It is thus possible to guide the vehicle 1 to a stop spot corresponding to the size of the vehicle 1.

In addition, in the tire management system 100, when the vehicle 1 is the specific vehicle, the first route information is output, wherein the first route information includes the specific first route that is one of a plurality of first routes and passes through the specific road. This makes it possible to, when the vehicle 1 for which the abnormality has been detected is the specific vehicle, transmit, to the driver of the vehicle 1 or the like, a route that passes through the specific road to the specific stop spot. It is thus possible to define, as the specific vehicle, a vehicle that is restricted to pass through only the specific road, and guide the specific vehicle to the specific stop spot by observing the traffic restriction when the abnormality has been detected for the tire 11 of the specific vehicle.

In addition, in the tire management system 100, the first route information including the first route that is a route to a specific stop spot that is present in the range of the first specific distance from the current position of the vehicle 1, is output. This makes it possible to guide the vehicle 1 for which the abnormality has been detected, to the specific stop spot that is present in the range of the first specific distance from the vehicle 1.

In addition, in the tire management system 100, when the specific stop spot being the business office is present in the range of the first specific distance from the current position of the vehicle 1, the first route information including the first route to the specific stop spot is output. In addition, when the specific stop spot being the business office is absent, the first route information including the first route to the specific stop spot that is present in the range of the first specific distance from the current position of the vehicle 1, is output. In addition, when the specific stop spot that is output is not the business office, the first notification information is output to the output destination corresponding to the provider, wherein the first notification information includes an indication that the abnormality has been detected and the specific stop spot. With this configuration, when the specific stop spot being the business office is present in the range of the first specific distance from the current position of the vehicle 1 for which the abnormality has been detected, it is possible to guide the vehicle 1 to the business office. In addition, when the specific stop spot being the business office is absent, it is possible to guide the vehicle 1 to the specific stop spot that is present in the range of the first specific distance from the position of the vehicle 1. In addition, when the vehicle 1 is guided to the specific stop spot that is not the business office, it is possible to transmit to the provider an indication that the abnormality has been detected for the tire 11 of the vehicle 1, and the specific stop spot for which the vehicle 1 is heading. It is thus possible for the driver of the vehicle 1 or the like to eliminate the time and effort to make contact with the provider to dissolve the abnormality of the tire 11.

In addition, in the tire management system 100, when the specific stop spot that is output is not the business office, the vehicle 1 is the connected vehicle, and the abnormality has been detected for the tire 11 attached to the tractor 7, the second route information is output to the output destination corresponding to the vehicle 1, wherein the second route information includes the second route that is a route to the business office that is present in the range of the second specific distance from the specific stop spot. With this configuration, when the vehicle 1 is guided to the specific stop spot that is not the business office, the vehicle 1 is the connected vehicle, and the abnormality has been detected for the tire 11 attached to the tractor 7, it is possible to transmit, to the driver of the vehicle 1 or the like, a route to the business office that is present in the range of the second specific distance from the specific stop spot. It is thus possible to guide the tractor 7 that has been disconnected from the trailer 8 at the specific stop spot, to the business office that is present in the range of the second specific distance from the specific stop spot.

It is noted that the vehicle 1 is not limited to an automobile, but may be any entity to which the tire 11 is attached. For example, the vehicle 1 may include a motorcycle, a three-wheel riding vehicle, and a motorbike.

In addition, the state information is not limited to the air pressure information, the air temperature information, and the acceleration information. For example, the state information may include the photograph image of the surface of the tire 11. In addition, the abnormality is not limited to the first abnormality, the second abnormality, and the third abnormality. For example, the abnormality may include an abnormality regarding the wear state of the tire 11.

In addition, the tire management system 100 may set, as the specific stop spot, a place that does not have equipment for providing the maintenance service corresponding to the abnormality and is not a parking lot. Here, in the present description, the parking lot refers to a place which is located outside roads and in which a parking space can be identified by a frame line, a tire stopper, a partition wall or the like. That is, in the present description, the parking lot does not include a place on the road. In addition, in the present description, the parking lot does not include a place, such as a vacant lot, where a parking space cannot be identified.

Specifically, the tire management system 100 may set, as the specific stop spot, a place that is on the road and does not have equipment for providing the maintenance service corresponding to the abnormality. For example, the place that is on the road and does not have equipment for providing the maintenance service corresponding to the abnormality includes an emergency parking zone on the motorway, a time-limited parking section provided on the road, and a road shoulder and a side strip at which parking or stopping is not prohibited. With this configuration, compared with a configuration where the specific stop spot is limited to either or both of: a place that has equipment for providing the maintenance service corresponding to the abnormality (the business office); and a parking lot, it is possible to quickly stop the vehicle 1 whose tire 11 has the abnormality.

In addition, among road shoulders that have a stop space corresponding to the size of the vehicle 1, only a road shoulder that satisfies a predetermined first specific condition may be set as the specific stop spot. For example, the first specific condition is that the width of the road including the road shoulder is wider than a distance that is determined according to the size of the vehicle 1. In addition, the first specific condition may be that the current traffic volume at the road including the road shoulder is smaller than a predetermined volume. In addition, the first specific condition may be that the maximum legal speed limit of the road including the road shoulder is lower than a predetermined speed. In addition, among side strips that have a stop space corresponding to the size of the vehicle 1, only a side strip that satisfies a predetermined second specific condition may be set as the specific stop spot. The second specific condition may be the same as the first specific condition. In addition, the second specific condition may be that the width of the side strip is wider than a distance that is determined according to the size of the vehicle 1. By allowing only such road shoulders and side strips to be set as the specific stop spots, it is possible to reduce the risk of collision of the vehicle 1 that has stopped at the specific stop spot, with another vehicle. In addition, by allowing the vehicle 1 to stop at the specific stop spot, it is possible to prevent a traffic congestion from occurring.

Second Embodiment

Figure 4:
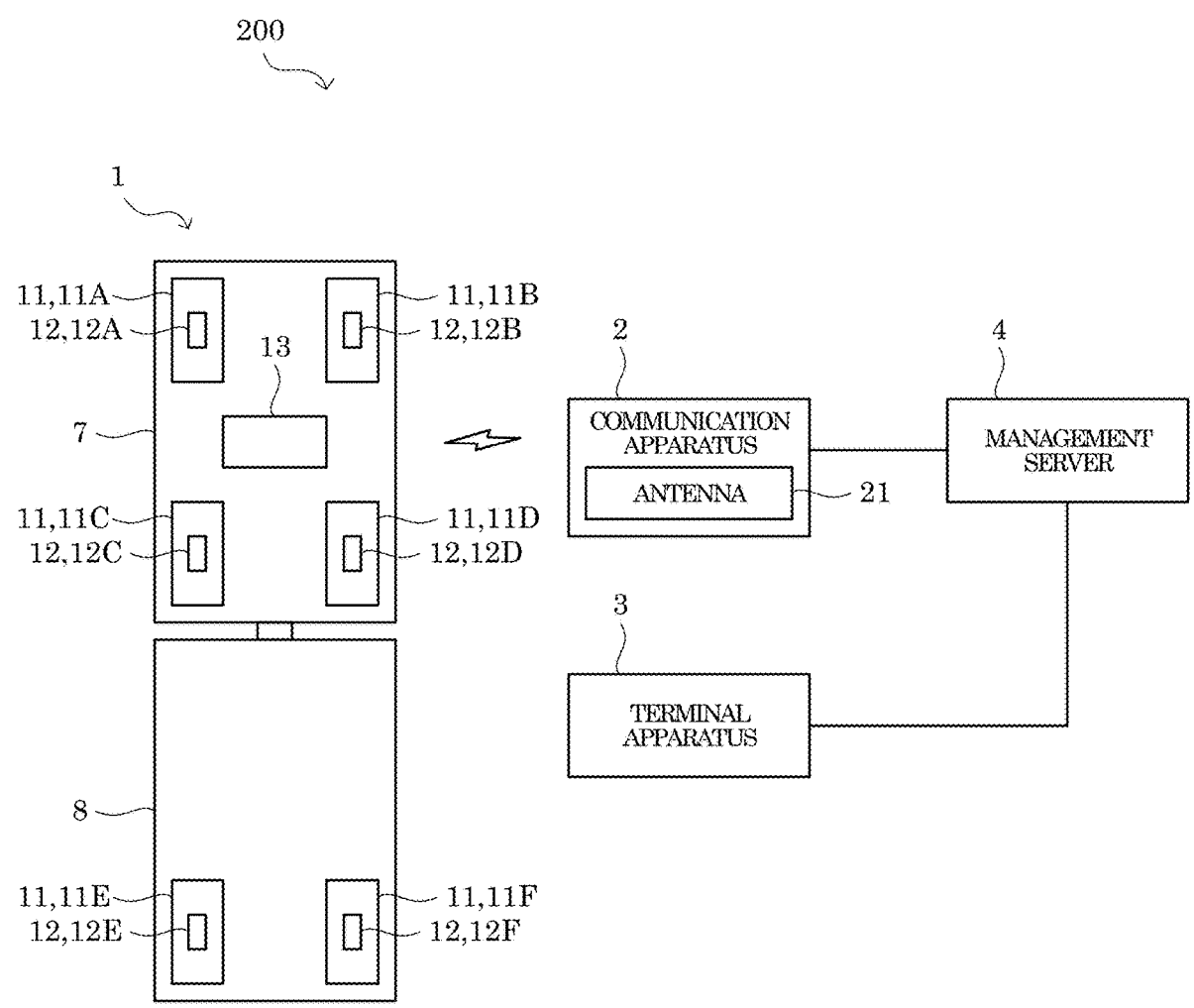
FIG. 4 is a diagram showing a configuration of a tire management system according to a second embodiment of the present disclosure.
Figure 5:
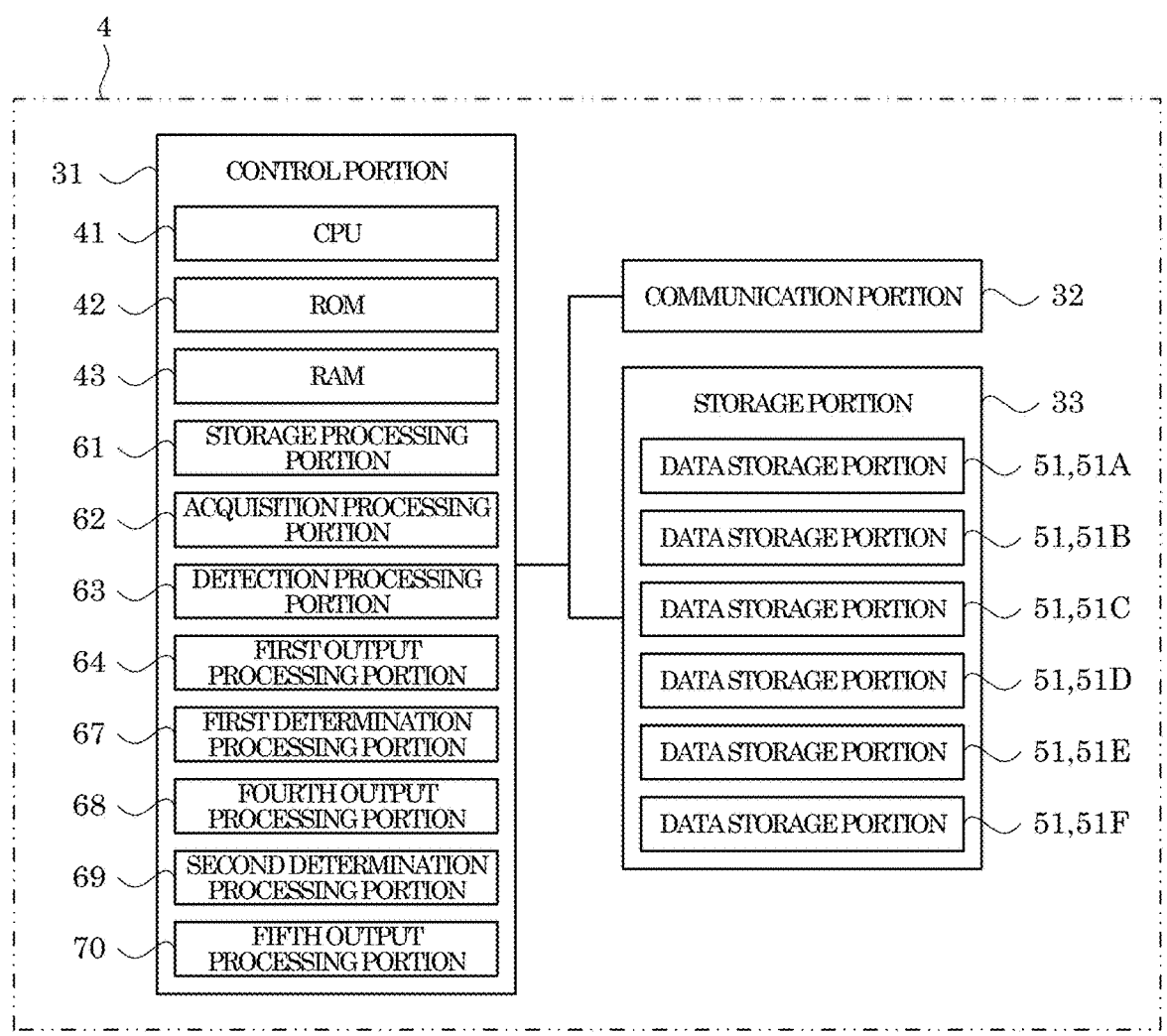
FIG. 5 is a diagram showing a configuration of a management server of the tire management system according to the second embodiment of the present disclosure.

Next, with reference to FIG. 4 and FIG. 5, a description is given of a configuration of a tire management system 200 according to a second embodiment of the present disclosure.

As shown in FIG. 4, the tire management system 200 includes the vehicle 1, the communication apparatus 2, the terminal apparatus 3, and the management server 4. In the tire management system 200, the management server 4 is connected so as to mutually communicate with the communication apparatus 2 and the terminal apparatus 3 via the communication network. It is noted that the vehicle 1 and the communication apparatus 2 have the same configuration as those of the tire management system 100.

The terminal apparatus 3 is an information processing apparatus that is used by employees of the business office. For example, the terminal apparatus 3 is a personal computer installed at the business office. It is noted that the terminal apparatus 3 may be a smartphone, a tablet terminal or the like used by the employees of the business office.

The management server 4 has the same configuration as the management server 4 of the tire management system 100 except that storage content of the storage portion 33 has been changed and that it includes a first determination processing portion 67, a fourth output processing portion 68, a second determination processing portion 69, and a fifth output processing portion 70 shown in FIG. 5 in place of the second output processing portion 65 and the third output processing portion 66. The following describes only configurations of the management server 4 different from those of the management server 4 of the tire management system 100.

In the tire management system 200, the stop spots are business offices. Accordingly, the stop spot information stored in the storage portion 33 is information regarding the business offices. Specifically, the stop spot information includes: the name, the location, and the telephone number of the business office; the size of the stop space; and the number of stop spaces. In addition, the stop spot information includes: business office identification information used for identifying the business office; and stock information of articles used for the maintenance service in the business office. The article includes, for example, the tire 11 for replacement. In addition, the stop spot information includes terminal apparatus identification information used for identifying the terminal apparatus 3.

After the first output processing portion 64 outputs the first route information, the first determination processing portion 67 determines whether or not the vehicle 1 is moving according to the first route information.

For example, the first determination processing portion 67 determines that the vehicle 1 is moving according to the first route information when the movement of the vehicle 1 according to the first route information has continued for over a predetermined time. It is noted that the first determination processing portion 67 may determine that the vehicle 1 is moving according to the first route information when the distance traveled by the vehicle 1 according to the first route information has exceeded a predetermined distance.

When the first output processing portion 64 outputs the first route information, the fourth output processing portion 68 outputs second notification information that includes an indication of the fact, to an output destination corresponding to the specific stop spot (the specific stop spot determined to be output) included in the first route information.

Specifically, when the first determination processing portion 67 has determined that the vehicle 1 is moving according to the first route information, the fourth output processing portion 68 outputs the second notification information to the output destination corresponding to the specific stop spot included in the first route information.

The second notification information includes: an indication that the first route information has been output; information such as the type, the color, and the size of the vehicle 1; information indicating the type of the abnormality; the current position of the vehicle 1; and an expected arrival time of the vehicle 1.

When the first determination processing portion 67 has determined that the vehicle 1 is moving according to the first route information, the fourth output processing portion 68 outputs the second notification information to the display portion of the terminal apparatus 3 corresponding to the specific stop spot included in the first route information.

It is noted that when the first output processing portion 64 outputs the first route information, the fourth output processing portion 68 may immediately output the second notification information to the output destination corresponding to the specific stop spot included in the first route information. In this case, the control portion 31 may not include the first determination processing portion 67.

When the first output processing portion 64 outputs the first route information, the second determination processing portion 69 determines whether or not the article is present in the specific stop spot included in the first route information.

Specifically, when the maintenance service corresponding to the abnormality detected by the detection processing portion 63 is the tire replacement service, the second determination processing portion 69 determines whether or not the tire 11 necessary for the tire replacement service is in stock of the specific stop spot included in the first route information. The second determination processing portion 69 determines whether or not the tire 11 necessary for the tire replacement service is in stock of the specific stop spot included in the first route information, based on the type and size of the tire 11 for which the abnormality has been detected, and the stop spot information.

When the second determination processing portion 69 has determined that the article is absent, the fifth output processing portion 70 outputs third notification information including an indication of the fact to an output destination corresponding to a business office that is, among the plurality of business offices, closest to the location of the specific stop spot included in the first route information and has the article.

The third notification information includes: an indication that the second determination processing portion 69 has determined that the article is absent; information such as the name, the location, and the telephone number of the specific stop spot included in the first route information; and information for identifying the article that is absent.

The fifth output processing portion 70 determines one of the plurality of business offices as the specific business office based on the stop spot information.

Specifically, when the fourth output processing portion 68 outputs the second notification information, the fifth output processing portion 70 outputs the third notification information to the display portion of the terminal apparatus 3 corresponding to the specific business office.

[Second Tire Management Process]

Figure 6:
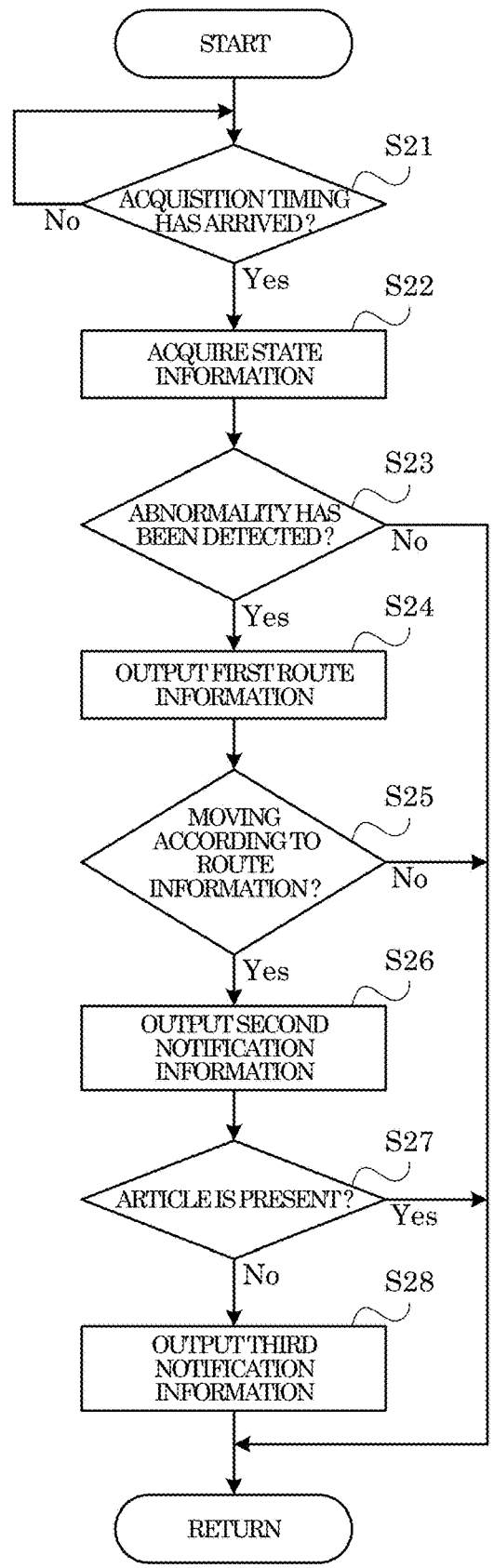
FIG. 6 is a flowchart showing an example of a second tire management process executed by the management server of the tire management system according to the second embodiment of the present disclosure.

In the following, with reference to FIG. 6, a description is given of an example of the procedure of a second tire management process executed by the control portion 31 of the management server 4 in the tire management system 200.

<Step S21>

First, in step S21, the control portion 31 determines whether or not the acquisition timing has arrived. Here, the process of step S21 is executed by the acquisition processing portion 62 of the control portion 31.

Here, upon determining that the acquisition timing has arrived (Yes side at step S21), the control portion 31 moves the process to step S22. In addition, upon determining that the acquisition timing has not arrived (No side at step S21), the control portion 31 waits, at step S21, for the acquisition timing to arrive.

<Step S22>

In step S22, the control portion 31 acquires the state information. Here, the process of step S22 is executed by the acquisition processing portion 62 of the control portion 31.

<Step S23>

In step S23, the control portion 31 determines whether or not the abnormality has been detected, based on the state information acquired in step S22. Here, the process of step S23 is executed by the detection processing portion 63 of the control portion 31.

Here, upon determining that the abnormality has been detected (Yes side at step S23), the control portion 31 moves the process to step S24. In addition, upon determining that the abnormality has not been detected (No side at step S23), the control portion 31 moves the process to step S21.

<Step S24>

In step S24, the control portion 31 outputs the first route information to the output destination corresponding to the vehicle 1. Here, the process of step S24 is executed by the first output processing portion 64 of the control portion 31.

<Step S25>

In step S25, the control portion 31 determines whether or not the vehicle 1 is moving according to the first route information output in step S24. Here, the process of step S25 is executed by the first determination processing portion 67 of the control portion 31.

Here, upon determining that the vehicle 1 is moving according to the first route information (Yes side at step S25), the control portion 31 moves the process to step S26. In addition, upon determining that the vehicle 1 is not moving according to the first route information (No side at step S25), the control portion 31 moves the process to step S21.

<Step S26>

In step S26, the control portion 31 outputs the second notification information to the output destination corresponding to the specific stop spot included in the first route information. Here, the process of step S26 is executed by the fourth output processing portion 68 of the control portion 31.

<Step S27>

In step S27, the control portion 31 determines whether or not the article is present in the specific stop spot included in the first route information. Here, the process of step S27 is executed by the second determination processing portion 69 of the control portion 31.

Here, upon determining that the article is present in the specific stop spot included in the first route information (Yes side at step S27), the control portion 31 moves the process to step S21. In addition, upon determining that the article is absent in the specific stop spot included in the first route information (No side at step S27), the control portion 31 moves the process to step S28.

<Step S28>

In step S28, the control portion 31 outputs the third notification information to the output destination corresponding to the specific business office. Here, the process of step S28 is executed by the fifth output processing portion 70 of the control portion 31.

As described above, in the tire management system 200, the stop spots are business offices. With this configuration, when an abnormality has occurred to the tire 11 of the vehicle 1, it is possible to guide the vehicle 1 to a business office corresponding to the size of the vehicle 1.

In addition, in the tire management system 200, when the first route information is output, the second notification information that includes an indication of the fact is output to an output destination corresponding to the specific stop spot included in the first route information. This makes it possible to notify the employees of the specific stop spot included in the first route information in advance that the vehicle 1 will visit there. It is thus possible for the specific stop spot to prepare for the visit of the vehicle 1.

In addition, in the tire management system 200, after the first route information is output, it is determined whether or not the vehicle 1 is moving according to the first route information. Subsequently, when it is determined that the vehicle 1 is moving according to the first route information, the second notification information is output to the output destination corresponding to the specific stop spot included in the first route information. This makes it possible for the second notification information to be output only when the vehicle 1 is moving according to the first route information. It is thus possible to restrict the preparation for the visit in the specific stop spot included in the first route information from being wasted.

In addition, in the tire management system 200, when the first route information is output, it is determined whether or not an article used for the maintenance service is present in the specific stop spot included in the first route information. Subsequently, when it is determined that the article is absent, the third notification information including an indication of the fact is output to an output destination corresponding to the specific business office that is, among the plurality of business offices, closest to the location of the specific stop spot included in the first route information and has the article. This makes it possible to notify the employees of the specific business office that the article is absent in the specific stop spot included in the first route information, and urge the employees to send the article. It is thus possible to eliminate the time and effort for the employees of the specific stop spot included in the first route information to arrange the article that is absent.

The embodiments of the present disclosure described above include the following disclosure items (1) to (29).

Disclosure item (1) is a tire management system including: an acquisition processing portion configured to acquire state information regarding a state of a pneumatic tire attached to a vehicle; a detection processing portion configured to detect an abnormality of the pneumatic tire based on the state information acquired by the acquisition processing portion; and a first output processing portion configured to, when the detection processing portion has detected the abnormality, output first route information to an output destination corresponding to the vehicle, wherein the first route information includes a first route that is a route to, among a plurality of predetermined stop spots, a specific stop spot that has a stop space corresponding to a size of the vehicle.

With the above-described configuration, it is possible to, when the abnormality of a tire has been detected, transmit, to the driver of the vehicle or the like, a route to the specific stop spot that has a stop space corresponding to the size of the vehicle. It is thus possible to guide the vehicle to a stop spot corresponding to the size of the vehicle.

Disclosure item (2) is the tire management system according to the disclosure item (1), wherein when the vehicle is a predetermined specific vehicle, the first output processing portion outputs the first route information including a specific first route that is one of a plurality of first routes and passes through a specific road corresponding to the specific vehicle.

With the above-described configuration, it is possible to, when the vehicle for which the abnormality of a tire has been detected is the specific vehicle, transmit, to the driver of the vehicle or the like, a route that passes through the specific road corresponding to the specific vehicle to the specific stop spot. It is thus possible to define, as the specific vehicle, a vehicle that is restricted to pass through only the specific road, and guide the specific vehicle to the specific stop spot by observing the traffic restriction when the abnormality has been detected for the tire of the specific vehicle.

Disclosure item (3) is the tire management system according to the disclosure item (2), wherein the first output processing portion outputs the first route information including the first route that is a route to a specific stop spot that is one of a plurality of specific stop spots and closest to a current position of the vehicle.

With the above-described configuration, it is possible to guide a vehicle for which the abnormality of a tire has been detected, to a closest specific stop spot.

Disclosure item (4) is the tire management system according to the disclosure item (2), wherein the first output processing portion outputs the first route information including the first route that is a route to a specific stop spot that is present in a range of a predetermined first specific distance from a current position of the vehicle.

With the above-described configuration, it is possible to guide a vehicle for which the abnormality of a tire has been detected, to a specific stop spot that is present in the range of the first specific distance from the vehicle.

Disclosure item (5) is the tire management system according to the disclosure item (4), wherein the stop spot includes a business office that provides a maintenance service corresponding to the abnormality; when a specific stop spot being the business office is present in the range of the first specific distance from the current position of the vehicle, the first output processing portion outputs the first route information including the first route that is a route to the specific stop spot, and when the specific stop spot being the business office is absent, the first output processing portion outputs the first route information including the first route that is a route to a specific stop spot that is present in the range of the first specific distance from the current position of the vehicle, and the tire management system includes a second output processing portion configured to, when the specific stop spot output by the first output processing portion is not the business office, output first notification information that includes an indication that the abnormality has been detected, and the specific stop spot, to an output destination corresponding to a provider who provides a road service.

With the above-described configuration, when the specific stop spot being the business office is present in the range of the first specific distance from the current position of the vehicle for which the abnormality has been detected, it is possible to guide the vehicle to the business office. In addition, when the specific stop spot being the business office is absent, it is possible to guide the vehicle to a specific stop spot that is present in the range of the first specific distance from the vehicle. In addition, when the vehicle is guided to a specific stop spot that is not a business office, it is possible to transmit, to the provider of the road service, an indication that the abnormality has been detected for a tire of the vehicle, and the specific stop spot for which the vehicle is heading. It is thus possible for the driver of the vehicle or the like to eliminate the time and effort to make contact with the provider of the road service to dissolve the abnormality of the tire.

Disclosure item (6) is the tire management system according to the disclosure item (4), wherein the stop spot includes a business office that provides a maintenance service corresponding to the abnormality; when a specific stop spot being the business office is present in the range of the first specific distance from the current position of the vehicle, the first output processing portion outputs the first route information including the first route that is a route to the specific stop spot, and when the specific stop spot being the business office is absent, the first output processing portion outputs the first route information including the first route that is a route to a specific stop spot that is present in the range of the first specific distance from the current position of the vehicle; and the tire management system includes a third output processing portion configured to output second route information to the output destination corresponding to the vehicle when the specific stop spot output by the first output processing portion is not the business office, the vehicle is a connected vehicle composed of a tractor and a trailer drawn by the tractor, and the abnormality has been detected for a pneumatic tire attached to the tractor, wherein the second route information includes a second route that is a route to a business office that is present in a range of a predetermined second specific distance from the specific stop spot.

With the above-described configuration, when the specific stop spot being the business office is present in the range of the first specific distance from the current position of the vehicle for which the abnormality has been detected, it is possible to guide the vehicle to the business office. In addition, when the specific stop spot being the business office is absent, it is possible to guide the vehicle to the specific stop spot that is present in the range of the first specific distance from the vehicle. In addition, when the vehicle is guided to a specific stop spot that is not a business office, the vehicle is a connected vehicle, and the abnormality has been detected for a tire attached to the tractor, it is possible to transmit, to the driver of the vehicle or the like, a route to the business office that is present in the range of the second specific distance from the specific stop spot. It is thus possible to guide the tractor that has been disconnected from the trailer at the specific stop spot, to the business office that is present in the range of the second specific distance from the specific stop spot.

Disclosure item (7) is the tire management system according to any one of the disclosure items (2) to (4), wherein the stop spot is a business office that provides a maintenance service corresponding to the abnormality.

With the above-described configuration, when the abnormality of a tire has been detected, it is possible to guide the vehicle to a business office that has a stop space corresponding to the size of the vehicle.

Disclosure item (8) is the tire management system according to the disclosure item (7), including: a first determination processing portion configured to, after an output of the first route information, determine whether or not the vehicle is moving according to the first route information; and a fourth output processing portion configured to, when the first determination processing portion has determined that the vehicle is moving according to the first route information, output second notification information including an indication that the first route information has been output, to an output destination corresponding to the specific stop spot included in the first route information.

With the above-described configuration, it is possible to notify the employees of business office being the specific stop spot in advance that the vehicle will visit there. It is thus possible for the business office to prepare for the visit of the vehicle.

Disclosure item (9) is the tire management system according to the disclosure item (7) or (8), including: a second determination processing portion configured to, when the first route information is output, determine whether or not an article used for the maintenance service is present in the specific stop spot included in the first route information; and a fifth output processing portion configured to, when the second determination processing portion has determined that the article is absent, output third notification information including an indication of the fact to an output destination corresponding to a specific business office that is, among a plurality of business offices, closest to the specific stop spot and has the article.

With the above-described configuration, it is possible to notify the employees of the specific business office that the article is absent in the business office being the specific stop spot and urge the employees to send the article. It is thus possible to eliminate the time and effort for the employees of the business office being the specific stop spot to arrange the article that is absent.

Disclosure item (10) is a tire management method including: an acquisition step of acquiring state information regarding a state of a pneumatic tire attached to a vehicle; a detection step of detecting an abnormality of the pneumatic tire based on the state information acquired in the acquisition step; and an output step of, when the abnormality has been detected in the detection step, outputting first route information to an output destination corresponding to the vehicle, wherein the first route information includes a first route that is a route to, among a plurality of predetermined stop spots, a specific stop spot that has a stop space corresponding to a size of the vehicle.

Disclosure item (11) is a tire management system including: an acquisition processing portion configured to acquire state information regarding a state of a pneumatic tire attached to a vehicle; a detection processing portion configured to detect an abnormality of the pneumatic tire based on the state information acquired by the acquisition processing portion; and a first output processing portion configured to, when the detection processing portion has detected the abnormality, output first route information to an output destination corresponding to the vehicle, wherein the first route information includes a first route that is a route to, among a plurality of predetermined stop spots, a specific stop spot that has a stop space corresponding to a size of the vehicle, wherein: when the vehicle is a predetermined specific vehicle, the first output processing portion outputs the first route information including a specific first route that is one of a plurality of first routes and passes through a specific road corresponding to the specific vehicle; the first output processing portion outputs the first route information including the first route that is a route to a specific stop spot that is present in a range of a predetermined first specific distance from a current position of the vehicle; the stop spot includes a business office that provides a maintenance service corresponding to the abnormality, and a stop space that is not the business office; when a specific stop spot being the business office is present in the range of the first specific distance from the current position of the vehicle, the first output processing portion outputs the first route information including the first route that is a route to the specific stop spot; when the specific stop spot being the business office is absent and a specific stop spot not being the business office is present, the first output processing portion outputs the first route information including the first route that is a route to the specific stop spot not being the business office that is present in the range of the first specific distance from the current position of the vehicle; and the tire management system includes a second output processing portion configured to, when the specific stop spot output by the first output processing portion is not the business office, output first notification information that includes an indication that the abnormality has been detected, and the specific stop spot, to an output destination corresponding to a provider who provides a road service.

Disclosure item (12) is a tire management system including: an acquisition processing portion configured to acquire state information regarding a state of a pneumatic tire attached to a vehicle; a detection processing portion configured to detect an abnormality of the pneumatic tire based on the state information acquired by the acquisition processing portion; and a first output processing portion configured to, when the detection processing portion has detected the abnormality, output first route information to an output destination corresponding to the vehicle, wherein the first route information includes a first route that is a route to, among a plurality of predetermined stop spots, a specific stop spot that has a stop space corresponding to a size of the vehicle, wherein: when the vehicle is a predetermined specific vehicle, the first output processing portion outputs the first route information including a specific first route that is one of a plurality of first routes and passes through a specific road corresponding to the specific vehicle; the first output processing portion outputs the first route information including the first route that is a route to a specific stop spot that is present in a range of a predetermined first specific distance from a current position of the vehicle; the stop spot includes a business office that provides a maintenance service corresponding to the abnormality, and a stop space that is not the business office; when a specific stop spot being the business office is present in the range of the first specific distance from the current position of the vehicle, the first output processing portion outputs the first route information including the first route that is a route to the specific stop spot; when the specific stop spot being the business office is absent and a specific stop spot not being the business office is present, the first output processing portion outputs the first route information including the first route that is a route to the specific stop spot not being the business office that is present in the range of the first specific distance from the current position of the vehicle; and the tire management system includes a third output processing portion configured to output second route information to the output destination corresponding to the vehicle when the specific stop spot output by the first output processing portion is not the business office, the vehicle is a connected vehicle composed of a tractor and a trailer drawn by the tractor, and the abnormality has been detected for a pneumatic tire attached to the tractor, wherein the second route information includes a second route that is a route to a business office that is present in a range of a predetermined second specific distance from the specific stop spot.

Disclosure item (13) is a tire management system including: an acquisition processing portion configured to acquire state information regarding a state of a pneumatic tire attached to a vehicle; a detection processing portion configured to detect an abnormality of the pneumatic tire based on the state information acquired by the acquisition processing portion; and a first output processing portion configured to, when the detection processing portion has detected the abnormality, output first route information to an output destination corresponding to the vehicle, wherein the first route information includes a first route that is a route to, among a plurality of predetermined stop spots, a specific stop spot that has a stop space corresponding to a size of the vehicle, wherein: when the vehicle is a predetermined specific vehicle, the first output processing portion outputs the first route information including a specific first route that is one of a plurality of first routes and passes through a specific road corresponding to the specific vehicle; the stop spot is a business office that provides a maintenance service corresponding to the abnormality; and the tire management system includes: a first determination processing portion configured to, after an output of the first route information, determine whether or not the vehicle is moving according to the first route information; and a fourth output processing portion configured to, when the first determination processing portion has determined that the vehicle is moving according to the first route information, output second notification information including an indication that the first route information has been output, to an output destination corresponding to the specific stop spot included in the first route information.

Disclosure item (14) is the tire management system according to the disclosure item (13), wherein the first output processing portion outputs the first route information including the first route that is a route to a specific stop spot that is one of a plurality of specific stop spots and closest to a current position of the vehicle.

Disclosure item (15) is the tire management system according to the disclosure item (13), wherein the first output processing portion outputs the first route information including the first route that is a route to a specific stop spot that is present in a range of a predetermined first specific distance from a current position of the vehicle.

Disclosure item (16) is the tire management system according to any one of the disclosure items (13) to (15), including: a second determination processing portion configured to, when the first route information is output, determine whether or not an article used for the maintenance service is present in the specific stop spot included in the first route information; and a fifth output processing portion configured to, when the second determination processing portion has determined that the article is absent, output third notification information including an indication that it has been determined that the article is absent, to an output destination corresponding to a specific business office that is, among a plurality of business offices, closest to the specific stop spot and has the article.

Disclosure item (17) is a tire management system including: an acquisition processing portion configured to acquire state information regarding a state of a pneumatic tire attached to a vehicle; a detection processing portion configured to detect an abnormality of the pneumatic tire based on the state information acquired by the acquisition processing portion; and a first output processing portion configured to, when the detection processing portion has detected the abnormality, output first route information to an output destination corresponding to the vehicle, wherein the first route information includes a first route that is a route to, among a plurality of predetermined stop spots, a specific stop spot that has a stop space corresponding to a size of the vehicle, wherein: when the vehicle is a predetermined specific vehicle, the first output processing portion outputs the first route information including a specific first route that is one of a plurality of first routes and passes through a specific road corresponding to the specific vehicle; the stop spot is a business office that provides a maintenance service corresponding to the abnormality; the tire management system includes: a second determination processing portion configured to, when the first route information is output, determine whether or not an article used for the maintenance service is present in the specific stop spot included in the first route information; a fifth output processing portion configured to, when the second determination processing portion has determined that the article is absent, output third notification information including an indication that it has been determined that the article is absent, to an output destination corresponding to a specific business office that is, among a plurality of business offices, closest to the specific stop spot and has the article; and a fourth output processing portion configured to, when the first route information is output, output second notification information including an indication that the first route information has been output, to an output destination corresponding to the specific stop spot included in the first route information; and an indication that the article that is absent is arranged is notified to an employee of the specific stop spot included in the first route information to be output.

Disclosure item (18) is the tire management system according to the disclosure item (17), wherein the first output processing portion outputs the first route information including the first route that is a route to a specific stop spot that is one of a plurality of specific stop spots and closest to a current position of the vehicle.

Disclosure item (19) is the tire management system according to the disclosure item (17), wherein the first output processing portion outputs the first route information including the first route that is a route to a specific stop spot that is present in a range of a predetermined first specific distance from a current position of the vehicle.

Disclosure item (20) is the tire management system according to any one of the disclosure items (17) to (19), including: a first determination processing portion configured to, after an output of the first route information, determine whether or not the vehicle is moving according to the first route information, wherein the fourth output processing portion outputs the second notification information when the first determination processing portion has determined that the vehicle is moving according to the first route information.

Disclosure item (21) is a tire management system including: an acquisition processing portion configured to acquire state information regarding a state of a pneumatic tire attached to a vehicle; a detection processing portion configured to detect an abnormality of the pneumatic tire based on the state information acquired by the acquisition processing portion; and a first output processing portion configured to, when the detection processing portion has detected the abnormality, output first route information to an output destination corresponding to the vehicle, wherein the first route information includes a first route that is a route to, among a plurality of predetermined stop spots, a specific stop spot that has a stop space corresponding to a size of the vehicle, wherein a place that does not have equipment for providing a maintenance service corresponding to the abnormality is set as the specific stop spot.

Disclosure item (22) is the tire management system according to the disclosure item (21), wherein when the vehicle is a predetermined specific vehicle, the first output processing portion outputs the first route information including a specific first route that is one of a plurality of first routes and passes through a specific road corresponding to the specific vehicle.

Disclosure item (23) is the tire management system according to the disclosure item (22), wherein the first output processing portion outputs the first route information including the first route that is a route to a specific stop spot that is one of a plurality of specific stop spots and closest to a current position of the vehicle.

Disclosure item (24) is the tire management system according to the disclosure item (22), wherein the first output processing portion outputs the first route information including the first route that is a route to a specific stop spot that is present in a range of a predetermined first specific distance from a current position of the vehicle.

Disclosure item (25) is a tire management method that is executed by a processor included in a tire management system and includes: an acquisition step of acquiring state information regarding a state of a pneumatic tire attached to a vehicle; a detection step of detecting an abnormality of the pneumatic tire based on the state information acquired in the acquisition step; and a first output step of, when the abnormality has been detected in the detection step, outputting first route information to an output destination corresponding to the vehicle, wherein the first route information includes a first route that is a route to, among a plurality of predetermined stop spots, a specific stop spot that has a stop space corresponding to a size of the vehicle, wherein: in the first output step, when the vehicle is a predetermined specific vehicle, the first route information including a specific first route is output, the specific first route being one of a plurality of first routes and passing through a specific road corresponding to the specific vehicle; in the first output step, the first route information including the first route that is a route to a specific stop spot that is present in a range of a predetermined first specific distance from a current position of the vehicle, is output; the stop spot includes a business office that provides a maintenance service corresponding to the abnormality, and a stop space that is not the business office; in the first output step, when a specific stop spot being the business office is present in the range of the first specific distance from the current position of the vehicle, the first route information including the first route that is a route to the specific stop spot, is output; in the first output step, when the specific stop spot being the business office is absent and a specific stop spot not being the business office is present, the first route information including the first route that is a route to the specific stop spot not being the business office that is present in the range of the first specific distance from the current position of the vehicle, is output; and the tire management method includes a second output step of, when the specific stop spot output in the first output step is not the business office, outputting first notification information that includes an indication that the abnormality has been detected, and the specific stop spot, to an output destination corresponding to a provider who provides a road service.

Disclosure item (26) is a tire management method that is executed by a processor included in a tire management system and includes: an acquisition step of acquiring state information regarding a state of a pneumatic tire attached to a vehicle; a detection step of detecting an abnormality of the pneumatic tire based on the state information acquired in the acquisition step; and a first output step of, when the abnormality has been detected in the detection step, outputting first route information to an output destination corresponding to the vehicle, wherein the first route information includes a first route that is a route to, among a plurality of predetermined stop spots, a specific stop spot that has a stop space corresponding to a size of the vehicle, wherein: in the first output step, when the vehicle is a predetermined specific vehicle, the first route information including a specific first route is output, the specific first route being one of a plurality of first routes and passing through a specific road corresponding to the specific vehicle; in the first output step, the first route information including the first route that is a route to a specific stop spot that is present in a range of a predetermined first specific distance from a current position of the vehicle, is output; the stop spot includes a business office that provides a maintenance service corresponding to the abnormality, and a stop space that is not the business office; in the first output step, when a specific stop spot being the business office is present in the range of the first specific distance from the current position of the vehicle, the first route information including the first route that is a route to the specific stop spot, is output; in the first output step, when the specific stop spot being the business office is absent and a specific stop spot not being the business office is present, the first route information including the first route that is a route to the specific stop spot not being the business office that is present in the range of the first specific distance from the current position of the vehicle, is output; and the tire management method includes a third output step of outputting second route information to the output destination corresponding to the vehicle when the specific stop spot output in the first output step is not the business office, the vehicle is a connected vehicle composed of a tractor and a trailer drawn by the tractor, and the abnormality has been detected for a pneumatic tire attached to the tractor, wherein the second route information includes a second route that is a route to a business office that is present in a range of a predetermined second specific distance from the specific stop spot.

Disclosure item (27) is a tire management method that is executed by a processor included in a tire management system and includes: an acquisition step of acquiring state information regarding a state of a pneumatic tire attached to a vehicle; a detection step of detecting an abnormality of the pneumatic tire based on the state information acquired in the acquisition step; and a first output step of, when the abnormality has been detected in the detection step, outputting first route information to an output destination corresponding to the vehicle, wherein the first route information includes a first route that is a route to, among a plurality of predetermined stop spots, a specific stop spot that has a stop space corresponding to a size of the vehicle, wherein: in the first output step, when the vehicle is a predetermined specific vehicle, the first route information including a specific first route is output, the specific first route being one of a plurality of first routes and passing through a specific road corresponding to the specific vehicle; the stop spot is a business office that provides a maintenance service corresponding to the abnormality; and the tire management method includes: a first determination step of, after an output of the first route information, determining whether or not the vehicle is moving according to the first route information; and a fourth output step of, when it has been determined in the first determination step that the vehicle is moving according to the first route information, outputting second notification information including an indication that the first route information has been output, to an output destination corresponding to the specific stop spot included in the first route information.

Disclosure item (28) is a tire management method that is executed by a processor included in a tire management system and includes: an acquisition step of acquiring state information regarding a state of a pneumatic tire attached to a vehicle; a detection step of detecting an abnormality of the pneumatic tire based on the state information acquired in the acquisition step; and a first output step of, when the abnormality has been detected in the detection step, outputting first route information to an output destination corresponding to the vehicle, wherein the first route information includes a first route that is a route to, among a plurality of predetermined stop spots, a specific stop spot that has a stop space corresponding to a size of the vehicle, wherein: in the first output step, when the vehicle is a predetermined specific vehicle, the first route information including a specific first route is output, the specific first route being one of a plurality of first routes and passing through a specific road corresponding to the specific vehicle; the stop spot is a business office that provides a maintenance service corresponding to the abnormality; and the tire management method includes: a second determination step of, when the first route information is output, determining whether or not an article used for the maintenance service is present in the specific stop spot included in the first route information; a fifth output step of, when it has been determined in the second determination step that the article is absent, outputting third notification information including an indication that it has been determined that the article is absent, to an output destination corresponding to a specific business office that is, among a plurality of business offices, closest to the specific stop spot and has the article; and a fourth output step of, when the first route information is output, outputting second notification information including an indication that the first route information has been output, to an output destination corresponding to the specific stop spot included in the first route information; and an indication that the article that is absent is arranged is notified to an employee of the specific stop spot included in the first route information to be output.

Disclosure item (29) is a tire management method that is executed by a processor included in a tire management system and includes: an acquisition step of acquiring state information regarding a state of a pneumatic tire attached to a vehicle; a detection step of detecting an abnormality of the pneumatic tire based on the state information acquired in the acquisition step; and a first output step of, when the abnormality has been detected in the detection step, outputting first route information to an output destination corresponding to the vehicle, wherein the first route information includes a first route that is a route to, among a plurality of predetermined stop spots, a specific stop spot that has a stop space corresponding to a size of the vehicle, wherein a place that does not have equipment for providing a maintenance service corresponding to the abnormality is set as the specific stop spot.

The invention claimed is:

1. A tire management system comprising:
a server remote from a vehicle, the server including a processor configured to function as:
an acquisition processing portion configured to acquire state information regarding a state of a pneumatic tire attached to the vehicle,
a detection processing portion configured to detect an abnormality of the pneumatic tire based on the state information acquired by the acquisition processing portion, and
a first output processing portion configured to, under a condition where the detection processing portion has detected the abnormality, output first route information to an output destination corresponding to the vehicle, wherein the first route information includes a first route that is a route to, among a plurality of predetermined stop spots, a specific stop spot that has a stop space corresponding to a size of the vehicle;
a detection device in the pneumatic tire including a sensor configured to detect the state information, the detection device being configured to transmit wirelessly the state information detected by the sensor according to a first wireless communication standard; and
a vehicle-mounted communication apparatus in the vehicle and configured to transmit the state information detected by the sensor to an outside of the vehicle, wherein
under a condition where the vehicle is a predetermined specific vehicle, the first output processing portion outputs the first route information including a specific first route that is one of a plurality of first routes and passes through a specific road corresponding to the specific vehicle,
the first output processing portion outputs the first route information including the first route that is a route to a specific stop spot that is present in a range of a predetermined first specific distance from a current position of the vehicle,
the stop spot includes a business office that provides a maintenance service corresponding to the abnormality,
under a condition where a specific stop spot being the business office is present in the range of the first specific distance from the current position of the vehicle, the first output processing portion outputs the first route information including the first route that is a route to the specific stop spot, and under a condition where the specific stop spot being the business office is absent, the first output processing portion outputs the first route information including the first route that is a route to a specific stop spot that is present in the range of the first specific distance from the current position of the vehicle,
the processor functions as
a third output processing portion configured to output second route information to the output destination corresponding to the vehicle under a condition where the specific stop spot output by the first output processing portion is not the business office, the vehicle is a connected vehicle composed of a tractor and a trailer drawn by the tractor, and the abnormality has been detected for the pneumatic tire attached to the tractor, wherein the second route information includes a second route that is a route to a business office that is present in a range of a predetermined second specific distance from the specific stop spot, the processor is remote from the vehicle, the acquisition processing portion acquires the state information transmitted from the vehicle-mounted communication apparatus, the vehicle-mounted communication apparatus is configured to acquire position information of the vehicle and transmit the acquired position information and the state information to the outside of the vehicle, the vehicle-mounted communication apparatus, which is in the vehicle, is configured to communicate with the detection device, the first output processing portion outputs the first route information based on the position information transmitted from the vehicle-mounted communication apparatus, the vehicle-mounted communication apparatus includes a GPS receiver to acquire the position information, the vehicle-mounted communication apparatus is configured to transmit the state information and the position information wirelessly according to a second wireless communication standard, which has a wider communication range than the first wireless communication standard, the server is communicatively connected to a communication apparatus that performs wireless communication according to the second wireless communication standard with the vehicle-mounted communication apparatus, the acquisition processing portion of the processor acquires the state information transmitted from the vehicle-mounted communication apparatus to the server via the communication apparatus, and the first output processing portion outputs the first route information based on the position information transmitted from the vehicle-mounted communication apparatus to the server via the communication apparatus.

2. A tire management system comprising:

a server remote from a vehicle, the server including a processor configured to function as:

an acquisition processing portion configured to acquire state information regarding a state of a pneumatic tire attached to a vehicle, a detection processing portion configured to detect an abnormality of the pneumatic tire based on the state information acquired by the acquisition processing portion, and a first output processing portion configured to, under a condition where the detection processing portion has detected the abnormality output first route information to an output destination corresponding to the vehicle, wherein the first route information includes a first route that is a route to, among a plurality of predetermined stop spots, a specific stop spot that has a stop space corresponding to a size of the vehicle;

a detection device in the pneumatic tire including a sensor configured to detect the state information, the detection device being configured to transmit wirelessly the state information detected by the sensor according to a first wireless communication standard; and a vehicle-mounted communication apparatus in the vehicle and configured to transmit the state information detected by the sensor to an outside of the vehicle, wherein under a condition where the vehicle is a predetermined specific vehicle, the first output processing portion outputs the first route information including a specific first route that is one of a plurality of first routes and passes through a specific road corresponding to the specific vehicle, the stop spot is a business office that provides a maintenance service corresponding to the abnormality the processor functions as:

a first determination processing portion configured to, after an output of the first route information, determine whether or not the vehicle is moving according to the first route information, and a fourth output processing portion configured to, under a condition where the first determination processing portion has determined that the vehicle is moving according to the first route information, output second notification information including an indication that the first route information has been output, to an output destination corresponding to the specific stop spot included in the first route information, the processor is remote from the vehicle, the acquisition processing portion acquires the state information transmitted from the vehicle-mounted communication apparatus, the vehicle-mounted communication apparatus is configured to acquire position information of the vehicle and transmit the acquired position information and the state information to the outside of the vehicle, the vehicle-mounted communication apparatus, which is in the vehicle, is configured to communicate with the detection device, the first output processing portion outputs the first route information based on the position information transmitted from the vehicle-mounted communication apparatus, the vehicle-mounted communication apparatus includes a GPS receiver to acquire the position information, the vehicle-mounted communication apparatus is configured to transmit the state information and the position information wirelessly according to a second wireless communication standard, which has a wider communication range than the first wireless communication standard, the server is communicatively connected to a communication apparatus that performs wireless communication according to the second wireless communication standard with the vehicle-mounted communication apparatus, the acquisition processing portion of the processor acquires the state information transmitted from the vehicle-mounted communication apparatus to the server via the communication apparatus, the first output processing portion outputs the first route information based on the position information transmitted from the vehicle-mounted communication apparatus to the server via the communication apparatus, and the first determination processing portion determines whether the vehicle is moving in accordance with the first route information based on the position information transmitted from the vehicle-mounted communication apparatus to the server via the communication apparatus.

3. The tire management system according to claim 2, wherein
the detection device is configured to transmit the state information periodically,
the vehicle-mounted communication apparatus is configured to periodically transmit the state information and the position information, and
the first determination processing portion determines whether the vehicle is moving in accordance with the first route information based on the position information transmitted periodically.

4. The tire management system according to claim 3, wherein the first determination processing portion determines that the vehicle is moving in accordance with the first route information under a condition where the vehicle continues to move in accordance with the first route information for more than a predetermined period of time.

5. The tire management system according to claim 3, wherein the first determination processing portion determines that the vehicle is moving in accordance with the first route information under a condition where the distance traveled by the vehicle in accordance with the first route information exceeds a predetermined distance.

6. A tire management system comprising:
a server remote from a vehicle, the server including a processor configured to function as:
an acquisition processing portion configured to acquire state information regarding a state of a pneumatic tire attached to a vehicle,
a detection processing portion configured to detect an abnormality of the pneumatic tire based on the state information acquired by the acquisition processing portion, and
a first output processing portion configured to, under a condition where the detection processing portion has detected the abnormality, output first route information to an output destination corresponding to the vehicle;
a detection device in the pneumatic tire including a sensor configured to detect the state information, the detection device being configured to transmit wirelessly the state information detected by the sensor according to a first wireless communication standard; and
a vehicle-mounted communication apparatus in the vehicle and configured to transmit the state information detected by the sensor to an outside of the vehicle, wherein
the first route information includes a first route that is a route to, among a plurality of predetermined stop spots, a specific stop spot that has a stop space corresponding to a size of the vehicle
a place that does not have equipment for providing a maintenance service corresponding to the abnormality and is not a parking lot is set as the specific stop spot,
the processor is remote from the vehicle
the acquisition processing portion acquires the state information transmitted from the vehicle-mounted communication apparatus,
the vehicle-mounted communication apparatus is configured to acquire position information of the vehicle and transmit the acquired position information and the state information to the outside of the vehicle,
the vehicle-mounted communication apparatus, which is in the vehicle, is configured to communicate with the detection device,
the first output processing portion outputs the first route information based on the position information transmitted from the vehicle-mounted communication apparatus
the vehicle-mounted communication apparatus includes a GPS receiver to acquire the position information,
the vehicle-mounted communication apparatus is configured to transmit the state information and the position information wirelessly according to a second wireless communication standard, which has a wider communication range than the first wireless communication standard,
the server is communicatively connected to a communication apparatus that performs wireless communication according to the second wireless communication standard with the vehicle-mounted communication apparatus,
the acquisition processing portion of the processor acquires the state information transmitted from the vehicle-mounted communication apparatus to the server via the communication apparatus, and
the first output processing portion outputs the first route information based on the position information transmitted from the vehicle-mounted communication apparatus to the server via the communication apparatus.

7. The tire management system according to claim 6, wherein a place that is on a road and does not have the equipment for providing the maintenance service corresponding to the abnormality is set as the specific stop spot.

8. The tire management system according to claim 7, wherein
the place that is on a road and does not have the equipment for providing the maintenance service corresponding to the abnormality includes one or more of:
an emergency parking zone on a motorway;
a time-limited parking section provided on a road;
a road shoulder at which parking or stopping is not prohibited; and
a side strip at which parking or stopping is not prohibited.

9. The tire management system according to claim 8, wherein the place that is on a road and does not have the equipment for providing the maintenance service corresponding to the abnormality includes the road shoulder, and among road shoulders that have a stop space corresponding to the size of the vehicle, a road shoulder that satisfies a predetermined first specific condition is set as the specific stop spot.

10. The tire management system according to claim 8, wherein
the place that is on a road and does not have the equipment for providing the maintenance service corresponding to the abnormality includes the side strip, and
among side strips that have a stop space corresponding to the size of the vehicle, a side strip that satisfies a predetermined second specific condition is set as the specific stop spot.

11. A tire management method executed by a processor included in a tire management system, the tire management method comprising:
an acquisition step of acquiring state information regarding a state of a pneumatic tire attached to a vehicle;
a detection step of detecting an abnormality of the pneumatic tire based on the state information acquired in the acquisition step; and an output step of, under a condition where the abnormality has been detected in the detection step, outputting first route information to an output destination corresponding to the vehicle, wherein the first route information includes a first route that is a route to, among a plurality of predetermined stop spots, a specific stop spot that has a stop space corresponding to a size of the vehicle, and a place that does not have equipment for providing a maintenance service corresponding to the abnormality is set as the specific stop spot, the tire management system includes:
- a server remote from the vehicle, the server including the processor,
- a detection device in the pneumatic tire including a sensor configured to detect the state information, the detection device being configured to transmit wirelessly the state information detected by the sensor according to a first wireless communication standard
- a vehicle-mounted communication apparatus in the vehicle and configured to transmit the state information detected by the sensor to an outside of the vehicle, and
- the processor, which is remote from the vehicle, wherein in the acquisition step, the state information transmitted from the vehicle-mounted communication apparatus is acquired, the vehicle-mounted communication apparatus is configured to acquire the position information of the vehicle and transmit the acquired position information and the state information to the outside of the vehicle, in the output step, the first route information is output based on the position information transmitted from the vehicle-mounted communication apparatus, the vehicle-mounted communication apparatus, which is in the vehicle, is configured to communicate with the detection device, the vehicle-mounted communication apparatus includes a GPS receiver to acquire the position information, the vehicle-mounted communication apparatus is configured to transmit the state information and the position information wirelessly according to a second wireless communication standard, which has a wider communication range than the first wireless communication standard, the server is communicatively connected to a communication apparatus that performs wireless communication according to the second wireless communication standard with the vehicle-mounted communication apparatus, in the acquisition step, the state information transmitted from the vehicle-mounted communication apparatus to the server via the communication apparatus is acquired, and in the output step, the first route information is output based on the position information transmitted from the vehicle-mounted communication apparatus to the server via the communication apparatus.

12. The tire management method according to claim 11, wherein a place that does not have the equipment for providing the maintenance service corresponding to the abnormality and is not a parking lot is set as the specific stop spot.

13. The tire management method according to claim 12, wherein a place that is on a road and does not have the equipment for providing the maintenance service corresponding to the abnormality is set as the specific stop spot.

14. The tire management method according to claim 13, wherein the place that is on a road and does not have the equipment for providing the maintenance service corresponding to the abnormality includes one or more of: an emergency parking zone on a motorway; a time-limited parking section provided on a road; a road shoulder at which parking or stopping is not prohibited; and a side strip at which parking or stopping is not prohibited.

* * * * *